US012264737B2

(12) United States Patent
Lee et al.

(10) Patent No.: US 12,264,737 B2
(45) Date of Patent: Apr. 1, 2025

(54) ELECTRONIC SHIFT RANGE SWITCHING DEVICE

(71) Applicant: LS AUTOMOTIVE TECHNOLOGIES CO., LTD., Anyang-si (KR)

(72) Inventors: Won Lee, Siheung-si (KR); Hyun Seong Cho, Anyang-si (KR); Jin Han Park, Uiwang-si (KR)

(73) Assignee: LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 0 days.

(21) Appl. No.: 17/462,887

(22) Filed: Aug. 31, 2021

(65) Prior Publication Data

US 2022/0065343 A1 Mar. 3, 2022

(30) Foreign Application Priority Data

Aug. 31, 2020 (KR) .................. 10-2020-0110473

(51) Int. Cl.
*F16H 59/08* (2006.01)
*F16H 59/02* (2006.01)

(52) U.S. Cl.
CPC ......... *F16H 59/08* (2013.01); *F16H 59/0278* (2013.01); *F16H 2059/0295* (2013.01); *F16H 2059/081* (2013.01)

(58) Field of Classification Search
CPC ............. F16H 59/08; F16H 59/0278; F16H 2059/081; F16H 2059/0295

USPC ...................................... 74/473.12
See application file for complete search history.

(56) References Cited

U.S. PATENT DOCUMENTS

| 10,288,169 | B2 * | 5/2019 | Watanabe | G05G 25/02 |
| 2007/0159307 | A1 * | 7/2007 | Jannasch | B60K 37/06 340/407.1 |
| 2015/0152958 | A1 * | 6/2015 | Watanabe | F16H 61/22 74/473.12 |
| 2015/0159747 | A1 * | 6/2015 | Hoskins | F16H 59/0217 74/473.23 |
| 2017/0074391 | A1 * | 3/2017 | Tebbe | F16H 61/22 |
| 2017/0175883 | A1 * | 6/2017 | Watanabe | G05G 5/06 |
| 2017/0175884 | A1 * | 6/2017 | Watanabe | F16H 61/24 |
| 2018/0363774 | A1 * | 12/2018 | Yamamoto | F16H 61/22 |

(Continued)

FOREIGN PATENT DOCUMENTS

| EP | 1229272 A2 * | 8/2002 | B60K 37/06 |
| JP | 2008511063 A | 4/2008 | |
| WO | WO-2012064899 A1 * | 5/2012 | F16H 59/02 |

*Primary Examiner* — T. Scott Fix
(74) *Attorney, Agent, or Firm* — Rabin & Berdo, P.C.

(57) ABSTRACT

The present invention provides an electronic shift range switching device (10) which is configured to control a shift range of a vehicle, the device comprising: a housing unit (100); a shifting knob unit (200) exposed at one end thereof to the outside of the housing unit (100) and disposed at the other end thereof within the hosing unit (100) in such a manner as to be rotatable with respect to the housing unit (100); and a locking correction integrated unit (300) configured to control whether or not to interrupt the rotation of the shifting knob unit (200) and to return a position of the shifting knob unit (200) to a P shift range in a self-correction manner under a predetermined condition.

30 Claims, 23 Drawing Sheets

(56) References Cited

U.S. PATENT DOCUMENTS

2019/0249772 A1* 8/2019 Morimura ............... F16H 61/24
2019/0323600 A1* 10/2019 Jiran ....................... F16H 59/08

* cited by examiner

ELECTRONIC SHIFT RANGE SWITCHING DEVICE

CROSS-REFERENCE TO RELATED APPLICATIONS

This application claims the benefit of Korean Patent Application No. 10-2020-0110473, filed on Aug. 31, 2020 in the Korean Intellectual Property Office, which is incorporated herein by reference in its entirety.

BACKGROUND OF THE INVENTION

1. Field of the Invention

The present invention relates to a switch installed in a vehicle. More specifically, the present invention relates to a shift range switching device which implements the selection operation and/or the unlocking/locking or the self-correction returning operation of a vehicular transmission range through a compact structure.

2. Description of Related Art

The switch of the vehicle follows a recent trend toward an intensive combination of switches having various functions. The structure of the vehicular switch becomes more complicated in proportion to an increase in functions of the switch, thus leading to an increase in the possibility of erroneous operation of the switch.

In particular, in the case of a simple convenience function as well as an essential function of a vehicle, for example, even in the case of a gearshift lever of changing a gear shift range, gear shift is performed by an electromechanical or electronic switch. Such a switching device entails advantages and disadvantages associated with durability, a feeling of manipulation, or cognition of manipulation according to the feeling of manipulation depending on its type.

However, an emphasis is made on the importance of the durability and the cognition of a manipulation state through a user's manipulation in that the switching device is a vehicular device. A switch structure according to a conventional prior art involves a problem of the excessiveness of a space occupied by components and the inconvenience of manipulation due to a structural constraints. Particularly, the individual arrangement of each component for the individual operation of the switch makes it considerably difficult to implement a compact switch device.

In particular, recently, a shift range switch for a vehicle implements an electronic configuration by the aid of a shift-by-wire (SBW), and shows the tendency that various safety elements is added thereto in view of the properties of the electronic configuration. However, the conventional shift range switch involves a problem in that it becomes more complicated due to such functional addition and the overlapping of constituent elements thereof leads to an increase in the manufacturing cost and erroneous operation or maintenance.

SUMMARY OF THE INVENTION

The present invention has been made to solve the above-mentioned problems associated with the prior art, and it is an object of the present invention to provide an electronic shift range switching device which is configured to enable to implement a combined operation thereof through a compact and simple structure excluding overlapping elements so that durability can be enhanced and a more accurate operation can be achieved, and thus the manufacturing cost can be reduced and reliability of manipulation can be improved while accomplishing the minimization of a manipulation space.

To achieve the above object, the present invention provides an electronic shift range switching device which is configured to control a shift range of a vehicle, the device including: a housing unit; a shifting knob unit exposed at one end thereof to the outside of the housing unit and disposed at the other end thereof within the hosing unit in such a manner as to be rotatable with respect to the housing unit; and a locking correction integrated unit configured to control whether or not to interrupt the rotation of the shifting knob unit and to return a position of the shifting knob unit to a P shift range in a self-correction manner under a predetermined condition.

In the electronic shift range switching device, the locking correction integrated unit may include: an integrated single drive unit including a single driver provided in single number; an interlocking unit configured to control whether or not to interrupt the rotation of the shifting knob unit by using a driving force applied thereto from the single drive unit; and a self-correction unit configured to return the position of the shifting knob unit to the P shift range in a self-correction manner under the predetermined condition by using the driving force applied thereto from the single drive unit.

In the electronic shift range switching device, the integrated single drive unit may include: a single driver transfer unit configured to be brought into contact with the single driver to receive a driving force from the single driver and transfer the driving force to interlocking unit; and a single sharing transfer unit brought at least partially into contact with the single driver transfer unit to receive the driving force from the single driver transfer unit and transfer a moving force for permitting the movement of the interlocking unit and the received driving force to the interlocking unit and the self-correction unit, respectively.

The single driver transfer unit may be configured to be brought into direct contact with the single driver to receive the driving force from the single driver and transfer the driving force to the interlocking unit.

In the electronic shift range switching device, the single driver transfer unit may include: a first transfer unit disposed on a drive shaft of the single driver; and a second transfer unit meshingly engaged with the first transfer unit so as to be rotated.

In the electronic shift range switching device, the single sharing transfer unit may include a single sharing transfer gear unit configured to be is brought into direct contact with the single driver transfer unit to receive the driving force from the single driver transfer unit and transfer a moving force for permitting the movement of the interlocking unit and the received driving force to the interlocking unit and the self-correction unit, respectively.

In the electronic shift range switching device, the single sharing transfer gear unit may include: a single sharing transfer driving gear integrally formed with the single sharing transfer main gear with gear ratios different from each other; and a single sharing transfer main gear meshingly engaged with the single sharing transfer driving gear.

In the electronic shift range switching device, the single sharing transfer unit may further include a single sharing transfer sensing gear unit configured to detect the rotation state of the single sharing transfer gear unit.

In the electronic shift range switching device, the single sharing transfer sensing gear unit may include: a single sharing transfer sensing main gear integrally formed with the single driver transfer unit with gear ratios different from each other; and a single sharing transfer sensing sub gear meshingly engaged with the single sharing transfer sensing main gear so as to be rotated.

In the electronic shift range switching device, the interlocking unit may include: a trigger cam pin unit movably disposed at least partially within the housing unit and to be movable by means of the integrated single drive unit; and an interlocking cam pin unit movably disposed at least at one side thereof within the housing unit and is movably brought at least at the other side thereof into direct contact with the trigger cam pin unit to interrupt the rotation of the shifting knob unit.

In the electronic shift range switching device, the trigger cam pin unit may include: a trigger pin accommodating part formed within the housing unit; a trigger pin elastic part elastically supported inside the trigger pin accommodating part; a trigger pin brought at one end thereof into contact with the trigger pin elastic part so as to be elastically supported by the trigger pin elastic part; and a trigger pin cam disposed spaced apart from the trigger pin accommodating part and brought at least partially into constant contact with the other end of the trigger pin.

The trigger pin accommodating part may be formed within the housing unit, and the trigger pin elastic part may be disposed within the trigger pin accommodating part.

In the electronic shift range switching device, the trigger pin cam may be integrally formed at least at one side of the integrated single drive unit.

In the electronic shift range switching device, the trigger pin may include: a trigger pin body brought at one end thereof into contact with the trigger pin elastic part so as to be elastically supported by the trigger pin elastic part and brought at the other end thereof into constant contact with the trigger pin cam; a trigger pin interlocking contactor integrally connected to another side of the trigger pin body and brought into contact with the interlocking cam pin unit.

In the electronic shift range switching device, the interlocking cam pin unit may include: an interlocking pin accommodating part formed within the housing unit (more specifically a housing shaft; an interlocking pin elastic part elastically supported inside the interlocking pin accommodating part; an interlocking pin brought at one end thereof into contact with the interlocking pin elastic part so as to be elastically supported by the interlocking pin elastic part; and an interlocking pin cam disposed spaced apart from the interlocking pin accommodating part and brought at least partially into constant contact with the other end of the interlocking pin.

In the electronic shift range switching device, the interlocking pin may include: an interlocking pin body brought at one end thereof into contact with the interlocking pin elastic part so as to be elastically supported by the interlocking pin elastic part and brought at the other end thereof into constant contact with the interlocking pin cam; and an interlocking pin trigger contactor integrally connected to one side of the interlocking pin body and brought into contact with the trigger cam pin unit, whereby when the trigger cam pin unit is at least partially moved toward a center of rotation of the shifting knob unit, the interlocking pin of the interlocking cam pin unit is moved together with the at least part of the trigger cam pin unit so that a contact state between the interlocking pin and the interlocking pin cam can be released.

In the electronic shift range switching device, the interlocking pin trigger contactor may be positioned nearer to the center of rotation of the shifting knob unit than the at least part of the trigger cam pin unit on a contact point between the interlocking pin trigger contactor and the at least part of the trigger cam pin unit.

In the electronic shift range switching device, the self-correction unit may include: a self-correction lead rib configured to be movable by the driving force applied thereto from the single drive unit; and a self-correction following rib disposed spaced apart from the self-correction lead rib in such a manner as to be capable of coming into close contact with the self-correction lead rib so that the self-correction following rib rotates around the center of rotation of the shifting knob unit by receiving the driving force through the self-correction lead rib.

In the electronic shift range switching device, the integrated single drive unit may include: a single driver transfer unit configured to be brought into direct contact with the single driver to receive a driving force from the single driver and transfer the driving force to interlocking unit; and a single sharing transfer unit brought at least partially into contact with the single driver transfer unit to receive the driving force from the single driver transfer unit and transfer a moving force for permitting the movement of the interlocking unit and the received driving force to the interlocking unit and the self-correction unit, respectively, wherein the interlocking unit may include: a trigger cam pin unit movably disposed at least partially within the housing unit so as to be movable by means of the integrated single drive unit; and an interlocking cam pin unit movably disposed at least at one side thereof within the housing unit and is movably brought at least at the other side thereof into direct contact with the trigger cam pin unit to interrupt the shifting knob unit, and wherein the electronic shift range switching device may further include a shifting range sensing unit configured to detect the rotation state of the shifting knob unit and the single sharing transfer unit, the self-correction lead rib may be disposed on one side of the single sharing transfer unit, and the self-correction following rib may be disposed on one side of the shifting range sensing unit.

The self-correction lead rib may be integrally connectively disposed on one side of the single sharing transfer unit, and the self-correction following rib may be integrally connectively disposed at least at one side of the shifting range sensing unit.

In the electronic shift range switching device, the electronic shift range switching device may further include a detent unit configured to haptically sense the rotation of the shifting knob unit when the shifting knob unit is rotated with respect to an at least part of the housing unit.

In the electronic shift range switching device, the electronic shift range switching device may further include a detent unit configured to haptically sense the rotation of the shifting knob unit when the shifting knob unit is rotated with respect to an at least part of the housing unit, and wherein the detent unit may include: a detent profile cam disposed to circumferentially surround the housing shaft of the housing unit in such a manner as to be spaced apart from an outer circumference of the housing shaft; a detent accommodating part; a detent pin accommodatingly disposed at least at one end thereof within the detent accommodating part in a movable manner and brought at the other end thereof into direct contact with the detent profile cam; and a detent elastic part configured to elastically support the detent pin.

The detent accommodating part may be formed within the housing shaft, and the detent elastic part may be disposed at least partially within the detent accommodating part and brought at least at one end thereof into contact with the detent pin.

In the electronic shift range switching device, the self-correction unit may include a self-correction detent retraction unit configured to release a direct contact between an at least part of the detent pin and the detent profile cam when the self-correction lead rib and the self-correction following rib are moved together in a state of being engaged with each other.

In the electronic shift range switching device, the self-correction detent retraction unit may include: a retraction accommodating part; a retraction pin accommodatingly disposed at least partially within the retraction accommodating part in a movable manner; a retraction elastic part configured to elastically support the retraction pin; a retraction cam configured to establish a state where it is brought into constant contact with one end of the retraction pin; and a retraction detent pin contactor integrally formed with the detent pin so as to be contactable with the retraction pin so that the retraction detent pin contactor can be moved together with the retraction pin upon the movement of the retraction pin.

The retraction accommodating part may be formed on the outer circumferential surface of the housing shaft, and the retraction elastic part may be brought at one end thereof into contact with the retraction pin to elastically support the retraction pin.

In the electronic shift range switching device, the retraction detent pin contactor may be positioned nearer to the center of rotation of the shifting knob unit than an at least part of the retraction pin on a contact point between the retraction detent pin contactor and the at least part of the retraction pin.

In the electronic shift range switching device, the retraction pin may include: a retraction pin body elastically supported by the retraction elastic part; and a retraction pin detent contactor integrally formed with the retraction pin body so as to be brought into contact with the retraction detent pin contactor.

In the electronic shift range switching device, the electronic shift range switching device may further include a shifting range sensing unit configured to detect at least the rotation state of the shifting knob unit.

In the electronic shift range switching device, the shifting range sensing unit may include: a shifting range sensing main moving part connected to the shifting knob unit so as to be moved together with the shifting knob unit; a shifting range sensing sub moving part connected to the shifting range sensing main moving part so as to be movable relative to the shifting range sensing main moving part; a shifting range sensing moving part disposed on the shifting range sensing sub moving part; and a shifting range sensing fixing part disposed on the unit substrate disposed within the housing unit so as to be held in a fixed position, to correspond to a position of the shifting range sensing moving part.

In the electronic shift range switching device, the locking correction integrated unit may include: an integrated single drive unit including a single driver provided in single number; an interlocking unit configured to control whether or not to interrupt the rotation of the shifting knob unit by using a driving force applied thereto from the single drive unit; and a self-correction unit configured to return the position of the shifting knob unit to the P shift range in a self-correction manner under the predetermined condition by using the driving force applied thereto from the single drive unit, wherein the integrated single drive unit may include: a single driver transfer unit configured to be brought into contact with the single driver to receive a driving force from the single driver and transfer the driving force to interlocking unit; and a single sharing transfer unit brought at least partially into contact with the single driver transfer unit to receive the driving force from the single driver transfer unit and transfer a moving force for permitting the movement of the interlocking unit and the received driving force to the interlocking unit and the self-correction unit, respectively, wherein the single sharing transfer unit may include: a single sharing transfer gear unit configured to be is brought into direct contact with the single driver transfer unit to receive the driving force from the single driver transfer unit and transfer a moving force for permitting the movement of the interlocking unit and the received driving force to the interlocking unit and the self-correction unit, respectively; and a single sharing transfer sensing gear unit configured to detect the rotation state of the single sharing transfer gear unit, wherein the single sharing transfer sensing gear unit may include: a single sharing transfer sensing main gear integrally formed with the single driver transfer unit with gear ratios different from each other; and a single sharing transfer sensing sub gear meshingly engaged with the single sharing transfer sensing main gear so as to be rotated, and wherein the shifting range sensing unit may further include: a shifting range sharing transfer sensing moving part disposed on the single sharing transfer sensing sub gear; and a shifting range sharing transfer sensing fixing part disposed on the unit substrate to correspond to a position of the shifting range sharing transfer sensing moving part.

In the electronic shift range switching device, the shifting knob unit may be disposed to be rotatable with respect to the housing unit, and may further include a knob stopper part configured to restrict the rotation of the shifting knob unit.

In the electronic shift range switching device, the knob stopper part may include: a knob stopper body disposed in the housing unit; and a knob stopper-corresponding part disposed at the shifting knob unit, and configured to restrict a relative rotation between the shifting knob unit and the knob stopper body by an engagement between the knob stopper body and the knob stopper-corresponding part within a predetermined angular range.

Effects of the Invention

The electronic shift range switching device according to the present invention as constructed above has the following effects.

The electronic shift range switching device according to the present invention can implement a shift-by-wire function of a shift lever device for a vehicle while enhancing manipulation reliability and durability.

In addition, the electronic shift range switching device according to the present invention can enhance vehicle safety through the implementation of the interlocking operation of locking/unlocking of the rotation of the shifting knob unit before introduction of a specific signal, improve assemblability and maintainability through a simple configuration for implementing the locking/unlocking operation, and enable a compact configuration.

Further, the electronic shift range switching device according to the present invention can prevent a risk of a safety accident that may occur upon a subsequent start of the engine of a vehicle through the implementation of the self-correction returning operation in which a shift range of a transmission returns to a predetermined shift range in a self-correction manner after the turning off of the engine of the vehicle, improve assemblability and maintainability through such a simple configuration, and enable a compact configuration.

Besides, the electronic shift range switching device according to the present invention can enable the operation implementation through a drive element provided in single number while excluding overlapping constituent elements in implementing the interlocking operation and the self-correction operation so that problems associated with erroneous operation and maintenance can be avoided or minimized and the manufacturing cost competitiveness can be improved through cost reduction.

The electronic shift range switching device according to the present invention has been described centering on a shift rotary switch structure for implementing a shift-by-wire function, but it is obvious that the operating structure of the present invention can be applied to the implementation of various switching functions for a vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF REFERENCE NUMERALS OF THE DRAWINGS

Figure 1:
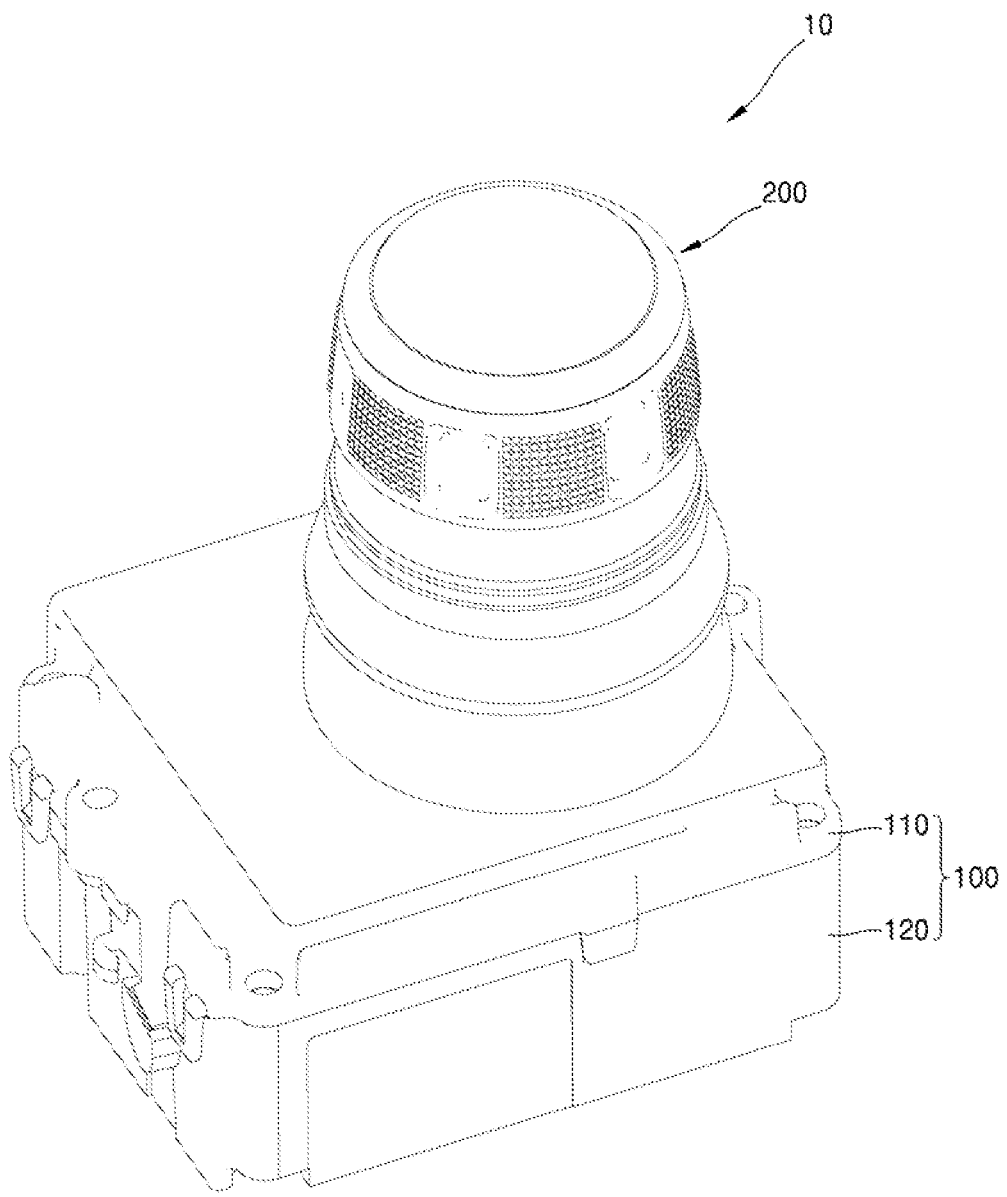
FIG. 1 is a schematic perspective view illustrating an electronic shift range switching device according to an embodiment of the present invention.

100: housing unit
200: shifting knob unit
300: locking correction integrated unit
400: integrated single drive unit
500: interlocking unit
600: self-correction unit
700: detent unit
800: shifting range sensing unit

DESCRIPTION OF THE PREFERRED EMBODIMENTS

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

Figure 2:
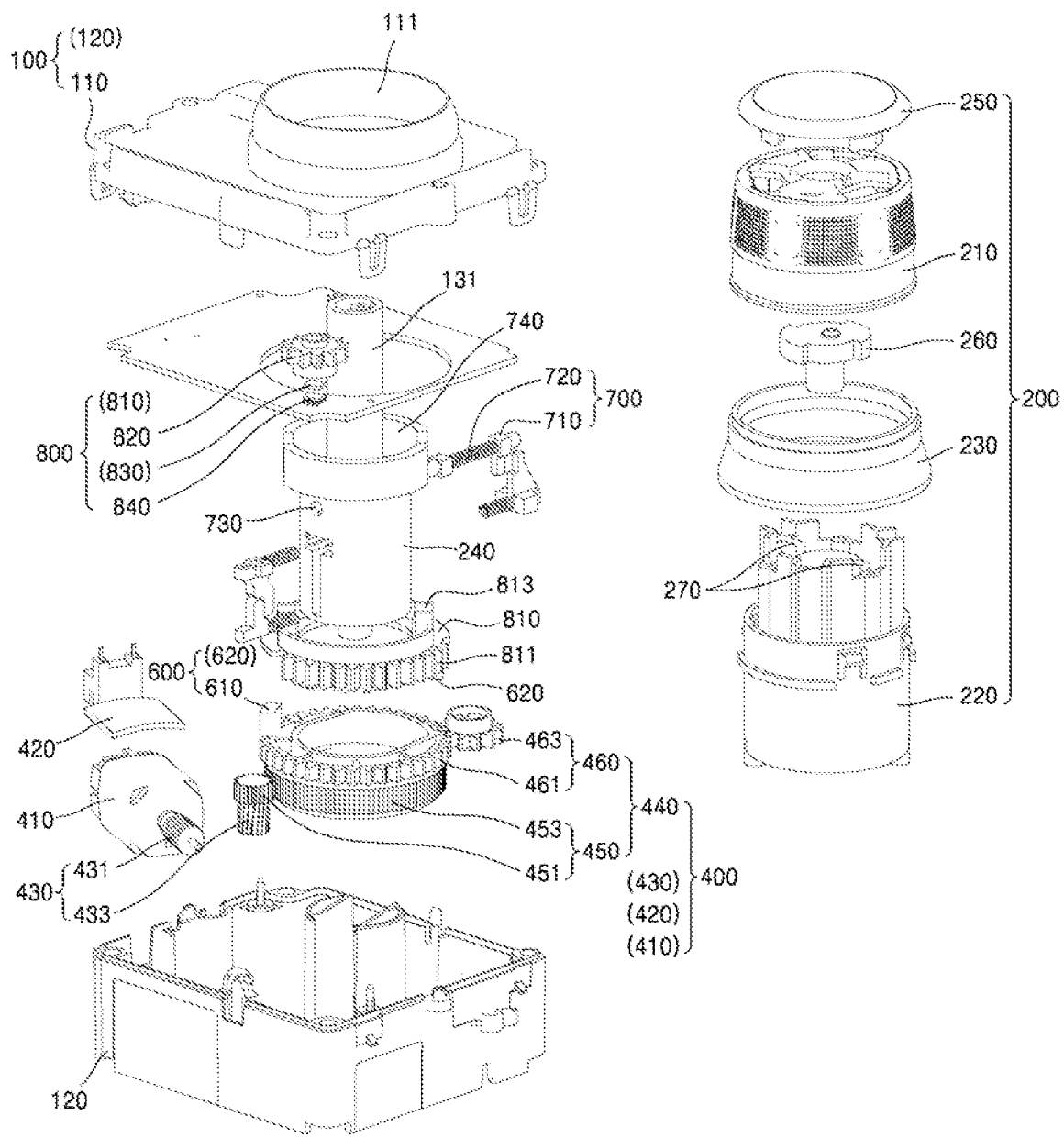
FIG. 2 is a schematic exploded perspective view illustrating an electronic shift range switching device according to an embodiment of the present invention.

The present invention is directed to an electronic shift range switching device which is configured to control a shift range of a vehicle. As shown in FIGS. 1 and 2, the electronic shift range switching device 10 of the present invention includes a housing unit 100, a shifting knob unit 200, a locking correction integrated unit 300.

The housing unit 100 includes a housing cover 110 and a housing base 120. The housing cover 110 and the housing base 120 are engaged with each other to define an internal space therebetween so that other constituent elements can be disposed in the internal space. The housing cover 110 has a through-opening 111 formed therein so that the shifting knob unit 200 is disposed at one end thereof in the internal space defined between the housing cover 110 and the housing base 120 therethrough and exposed at the other end thereof to the outside therethrough to enable the manipulation operation of a user, particularly a driver. The housing cover 110 includes a cover fastening part 113 formed at a side thereof, and the housing base 120 includes a base fastening part 123 formed at a side thereof so that the cover fastening part 113 and the base fastening part 123 are engagedly fastened to each other to prevent the housing cover 110 and the housing base 120 from being unwantedly separated and escaping from each other. In addition, a fastening structure between the housing cover 110 and the housing base 120 may be achieved through a separate fastening member such as a bolt.

A unit substrate 900 which will be described later is disposed in the internal space defined between the housing cover 110 and the housing base 120 to enable to transmit electrical signals from other constituent elements and form an electrical connection structure with an external device through a substrate connector (not shown).

In addition, the housing unit 100 of the present invention further includes a housing shaft 130. The housing shaft 130 can form a stable rotation support structure of the shifting knob unit 200 of the present invention. In some embodiments, the housing shaft 130 may be integrally formed with the housing base, but may be engaged separately with the housing shaft 130 as in this embodiment.

A knob stopper part 260 and 270 of performing a stopping function of the shifting knob unit, which will be described later, may be partially disposed at an upper end of the housing shaft 130.

Figure 3:
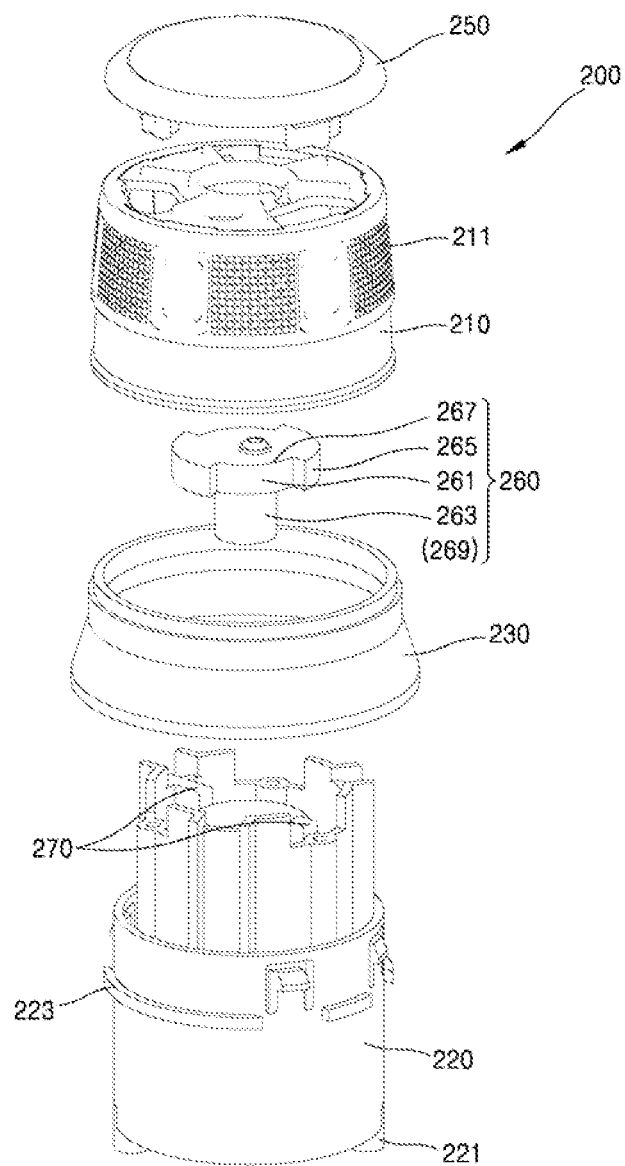
FIG. 3 is a schematic partially exploded perspective view illustrating a shifting knob unit of an electronic shift range switching device according to an embodiment of the present invention.

As shown in FIGS. 2 and 3, the shifting knob unit 200 is exposed at one end thereof to the outside of the housing unit 100 and is disposed at the other end thereof within the housing unit 100 in such a manner as to be rotatable with respect to the housing unit 100.

More specifically, in this embodiment, the shifting knob unit 200 includes a knob outer body 210, a knob inner body 220, a knob skirt body 230, and a knob cap 250, but is not limited thereto and can be modified in various manners depending on design specifications within the scope of achieving a rotation operation by a driver.

The knob outer body 210 has a groove 211 formed on an outer circumferential surface thereof so that a driver's hand can be prevented from slipping while the driver performs a rotation operation of the shifting knob unit 200 with him or her gripping the shifting knob unit 200.

A knob cap 250 is disposed at an upper end of the knob outer body 210 so that exterior finishing can be completed, and the knob inner body 220 is engaged with the inside of the knob outer body 210 so that a relative rotation between the knob outer body 210 and the knob inner body 220 can be restricted and the knob outer body 210 and the knob inner body 220 can perform a rotation operation together as if they were integrally formed with each other.

In this embodiment, the knob skirt body 230 is disposed between the knob outer body 210 and the knob inner body 220, and has an outer diameter larger than that of the knob inner body 220. When projected onto the through-opening 111, the knob skirt body 230 internally includes the through-opening 111 and has a larger effective area so that foreign substances can be prevented from being introduced into the housing unit 100.

The knob cap 250 is connected to the upper end of the knob outer body 210 so that exterior finishing can be achieved. In some embodiments, a separate switching sensing element such as a touch pad may be disposed at a position corresponding to the knob cap 250 to form a structure for configuring a separate input unit.

The electronic shift range switching device 10 of the present invention is implemented as a selector switch for selecting a shift range. In view of this, the rotation direction of the shifting knob unit 200 is permitted only within a predetermined angular range and the shifting knob unit 200 may have a limited configuration in a range other than the predetermined angular range. In other words, the shifting knob unit 200 is disposed to be rotatable with respect to the housing unit 100, and further includes the knob stopper part 260 and 270 that is configured to restrict the rotation of the shifting knob unit 200.

More specifically, the knob stopper part 260 and 270 of the present invention includes a knob stopper body 260 and a knob stopper-corresponding part 270. The knob stopper body 260 is disposed in the housing shaft 130 of the housing unit 100. The knob stopper body 260 includes a knob stopper main body 261 and a knob stopper shaft body 263. The knob stopper main body 261 includes a pair of opposed concaved recesses 267 with a predetermined angular range formed on an outer circumferential surface thereof, and a pair of opposed contact faces 265 formed on the outer circumferential surface thereof so as to be oriented to perpendicularly intersect the concaved recesses 267 to divide the concaved recesses 267. A knob stopper shaft body fastening part 269 is formed in a housing shaft fastening part 131 formed in the housing shaft 130. The knob stopper shaft body fastening part 269 is fastened to the knob stopper shaft body 263 so that they can be held in a position fixed state.

The knob stopper-corresponding part 270 is disposed at the shifting knob unit 200. The contact faces 265 are formed on the outer circumferential surface of the knob stopper main body 261 to divide the concaved recesses 267, and the knob stopper-corresponding part 270 restricts a relative rotation between the shifting knob unit 200 and the knob stopper body 260 by an engagement between the knob stopper body 260 and the knob stopper-corresponding part 270 within a predetermined angular range so that the knob stopper main body contact faces 265 can ultimately restrict a rotation angle range of the shifting knob unit 200 by the engagement between the knob stopper main body contact faces 265 and the knob stopper-corresponding part 270 along with the shifting knob unit 200.

Figure 18:
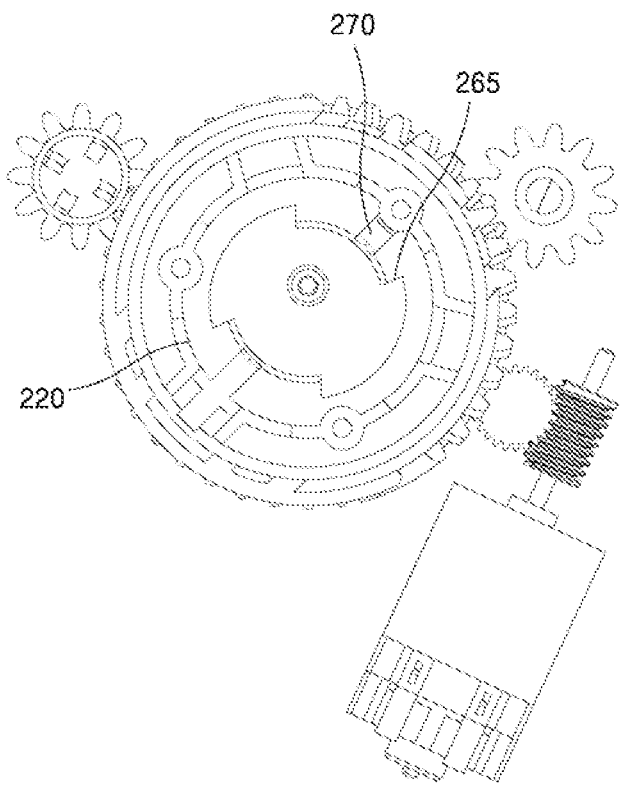
FIG. 18 is a schematic partial transverse cross-sectional view illustrating a knob stopper part in a state where a shift lever is in an N shift range in an electronic shift range switching device according to an embodiment of the present invention.
Figure 19:
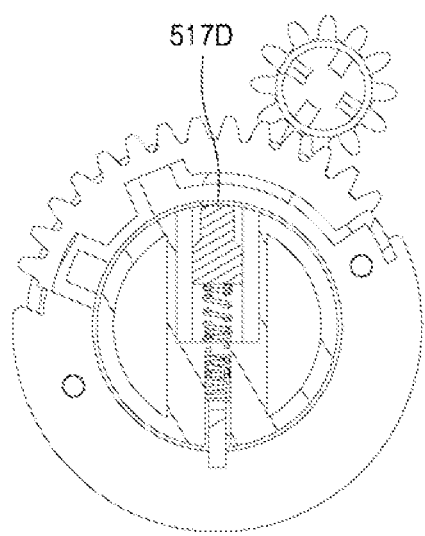
FIG. 19 is a schematic partial transverse cross-sectional view illustrating an interlocking unit in a state where a shift lever is in a D shift range in an electronic shift range switching device according to an embodiment of the present invention.
Figure 20:
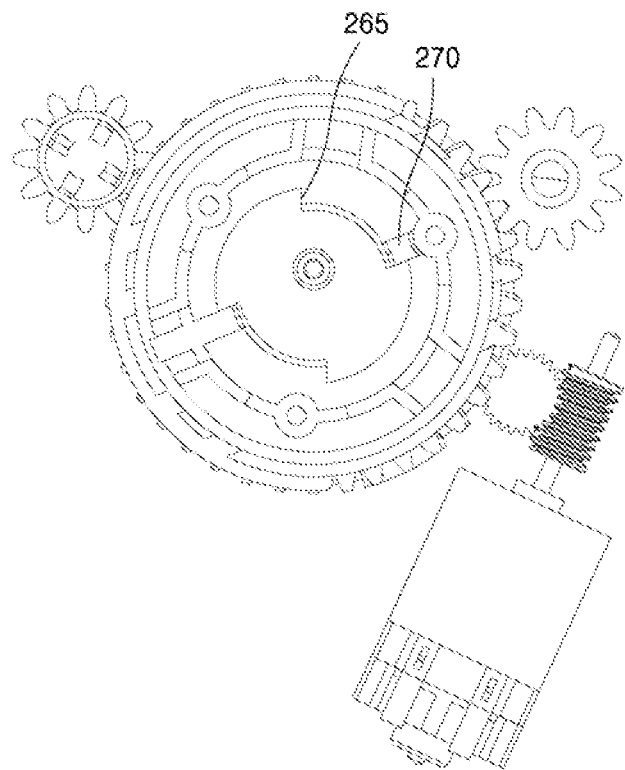
FIG. 20 is a schematic partial transverse cross-sectional view illustrating a knob stopper part in a state where a shift lever is in a D shift range in an electronic shift range switching device according to an embodiment of the present invention.
Figure 21:
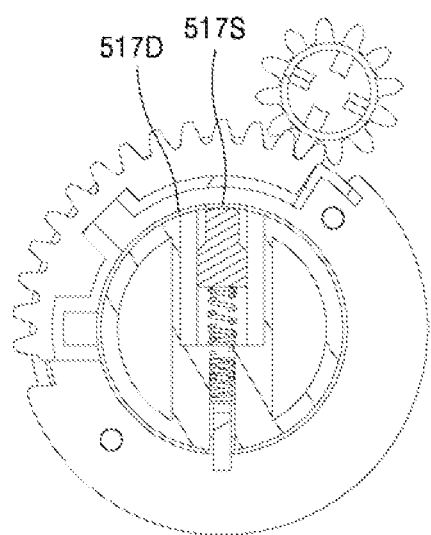
FIG. 21 is a schematic partial transverse cross-sectional view illustrating an interlocking unit in a state where a shift lever is in an S shift range in an electronic shift range switching device according to an embodiment of the present invention.
Figure 22:
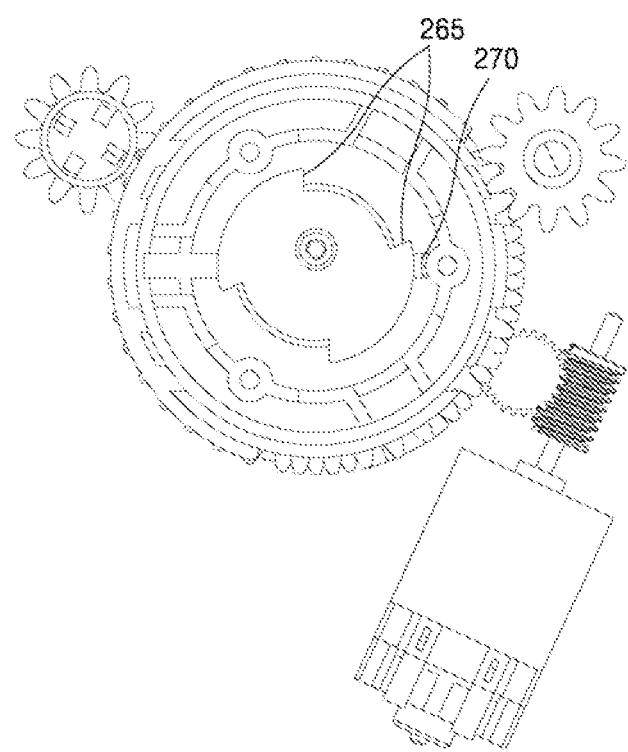
FIG. 22 is a schematic partial transverse cross-sectional view illustrating a knob stopper part in a state where a shift lever is in an S shift range in an electronic shift range switching device according to an embodiment of the present invention.
Figure 23:
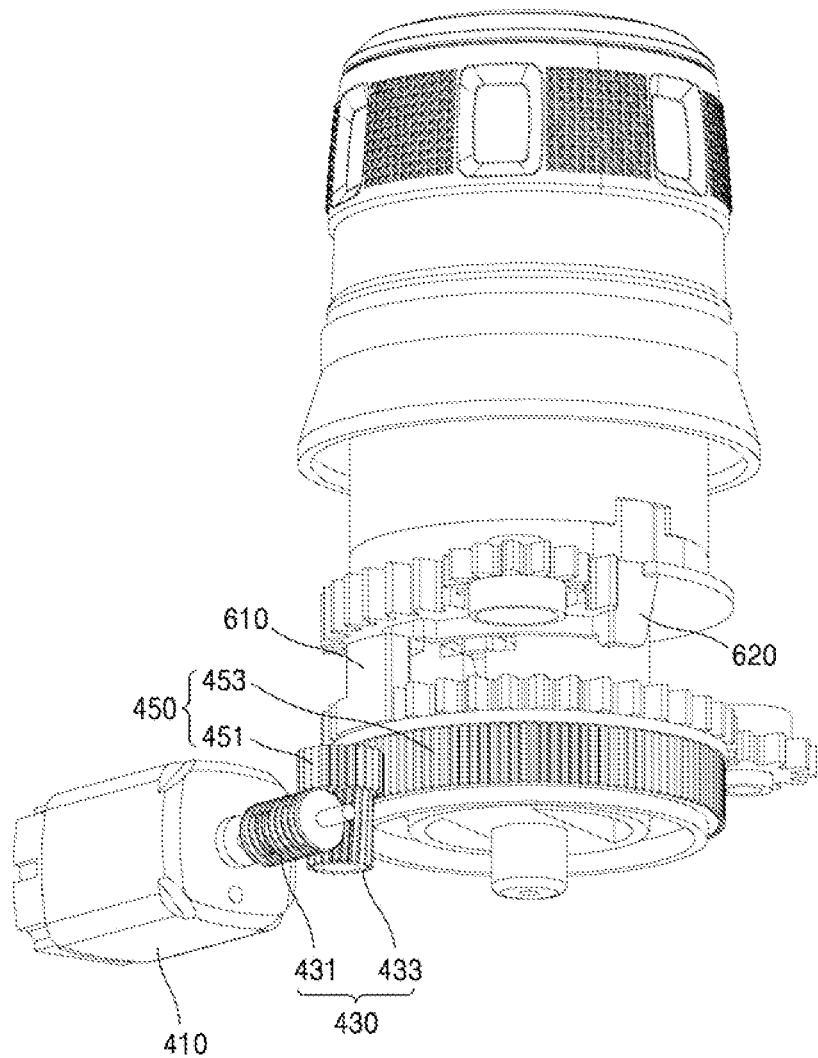
FIGS. 23 to 26 are schematic bottom perspective views illustrating an operation process of a self-correction unit of an electronic shift range switching device according to an embodiment of the present invention.
Figure 24:
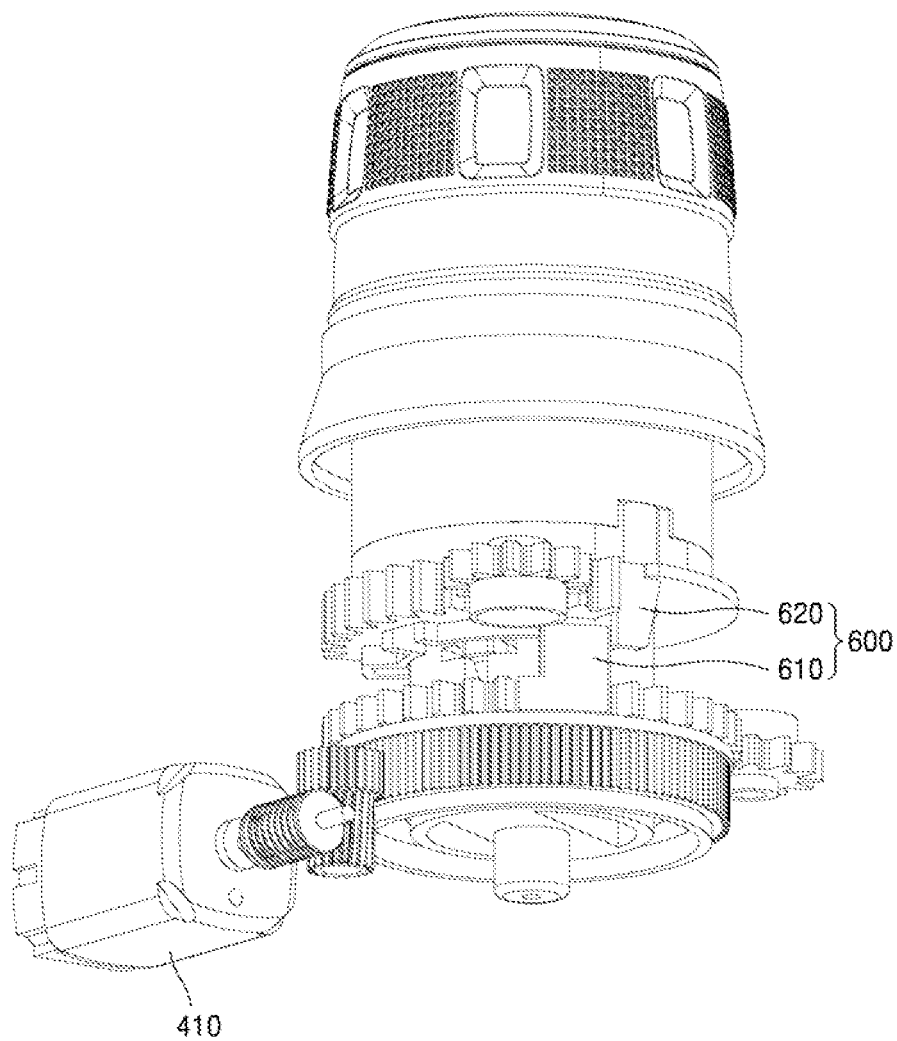
Figure 25:
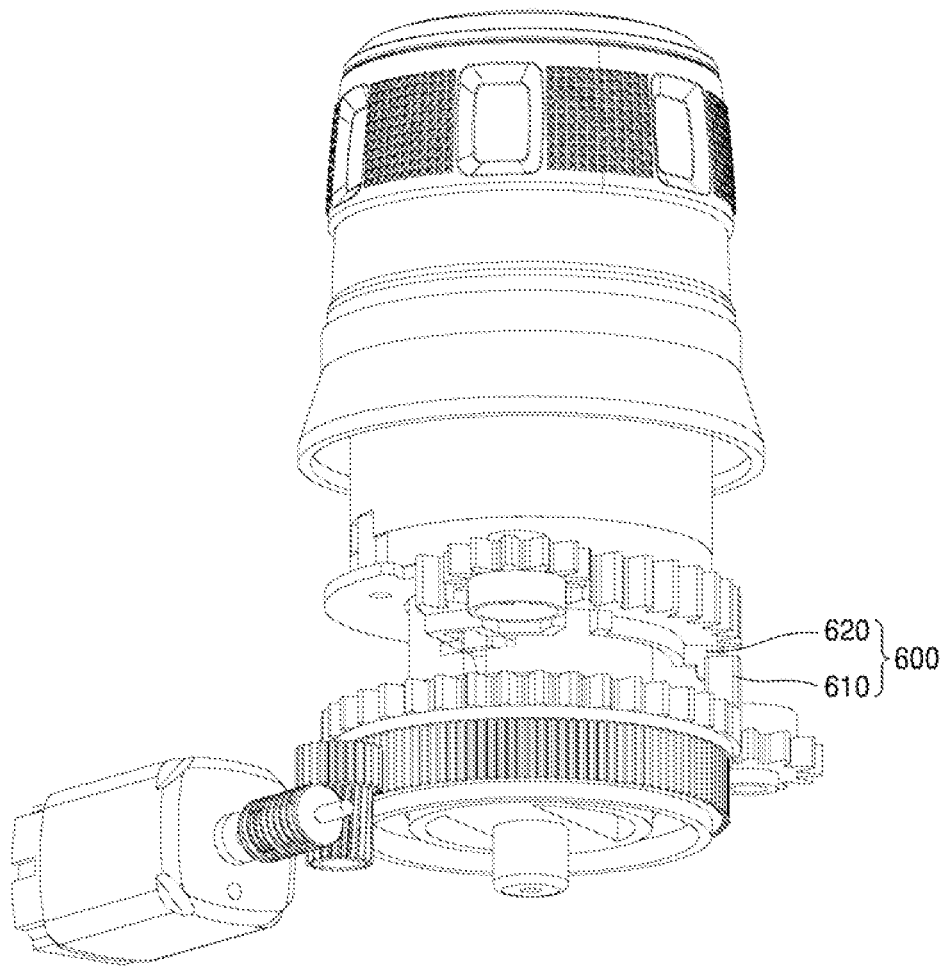
Figure 26:
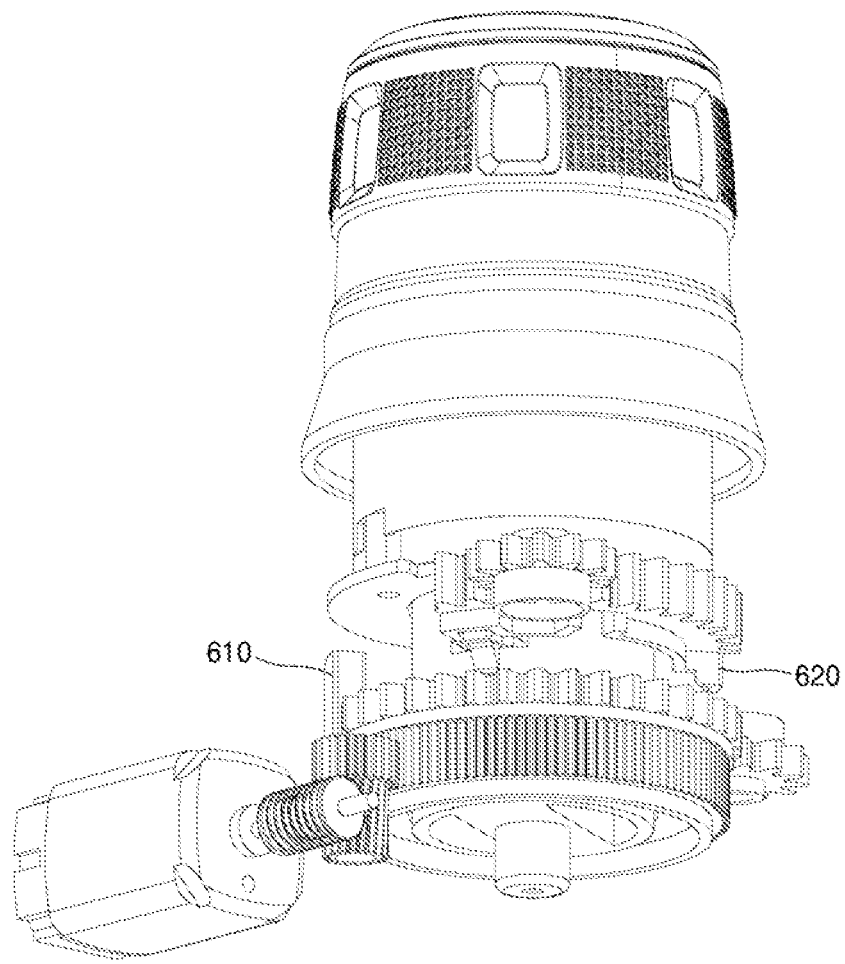

FIGS. 13, 15, 18, 20 and 22 show the states where there is a change or restriction in a relative position between the knob stopper body 260 and the knob stopper-corresponding part 270 is changed or restricted in the shift positions, i.e., a P shift range, an R shift range, an N shift range, a D shift range, and an S shift range which are selected by the rotation of the shifting knob unit 200. The rotation of the shifting knob unit 200 in a counterclockwise direction from the P shift range is restricted in FIG. 13, the relative rotation between the shifting knob unit 200 and the knob stopper body 260 in the R shift range of FIG. 5 and the N shift range of FIG. 18 is permitted, the rotation of the shifting knob unit 200 in a clockwise direction to the D shift range of FIG. 20 is permitted, and the rotation of the shifting knob unit 200 in a clockwise direction to the S shift range of FIG. 22 is permitted in some embodiments. In this case, the shifting knob unit 200 may have a certain pressing rotation structure at a lower portion thereof so that a restriction of a contact rotation between the knob stopper body 260 fixed in position at an upper end thereof and the knob stopper-corresponding part 270 can be released and a selection of the S shift range in the clockwise direction can be made through an additional rotation of the shifting knob unit 200. In this case, the shifting knob unit 200 may include an elastic member (not shown) at the lower portion thereof so that after the shifting knob unit 200 returns to an original position in the counterclockwise direction and a pressure applied to the shifting knob unit 200 is removed, a structure for a change or restriction in the relative position between the knob stopper body 260 and the knob stopper-corresponding part 270 can be formed.

Figure 4:
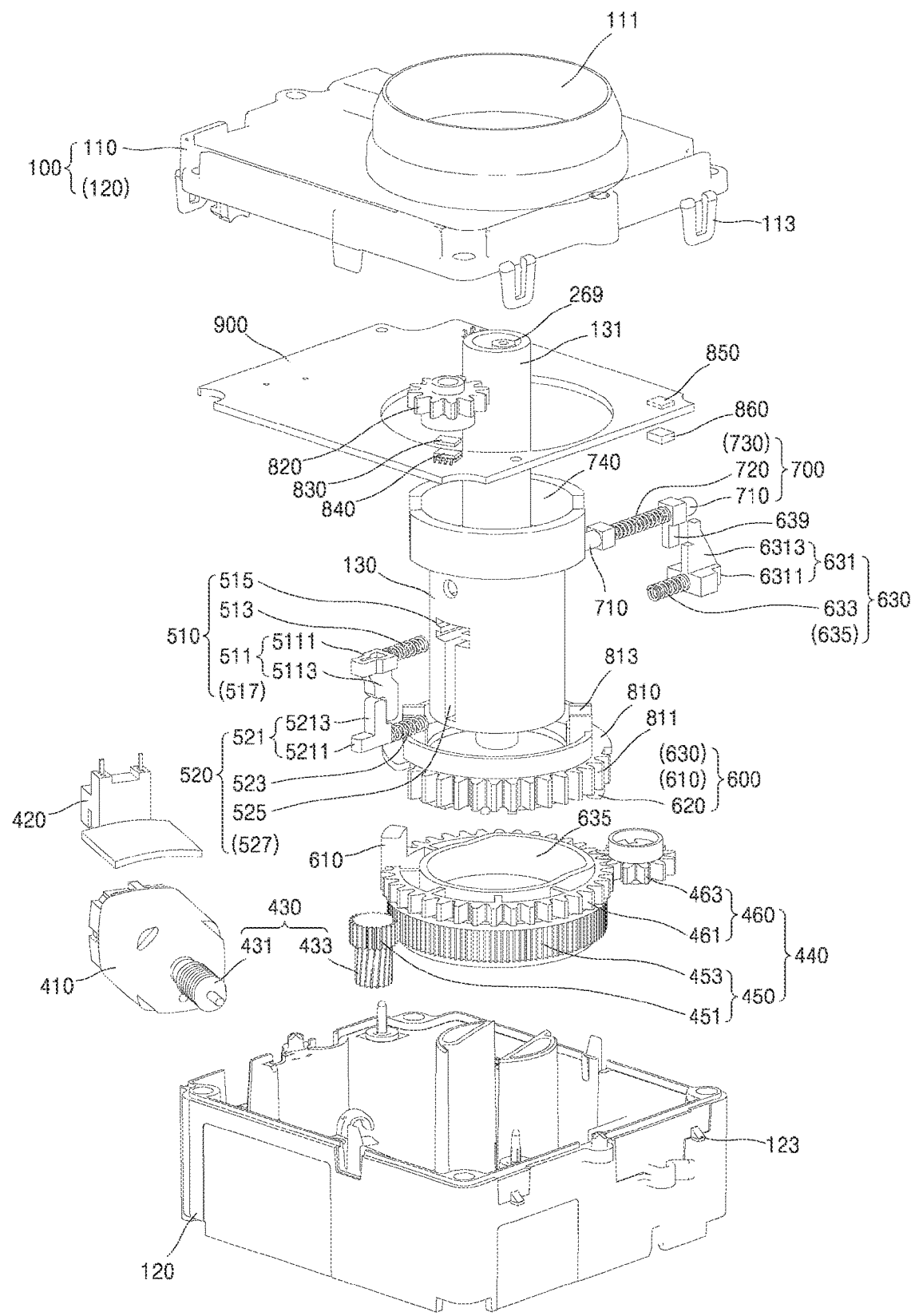
FIG. 4 is a schematic partially exploded perspective view illustrating an electronic shift range switching device according to an embodiment of the present invention.
Figure 5:
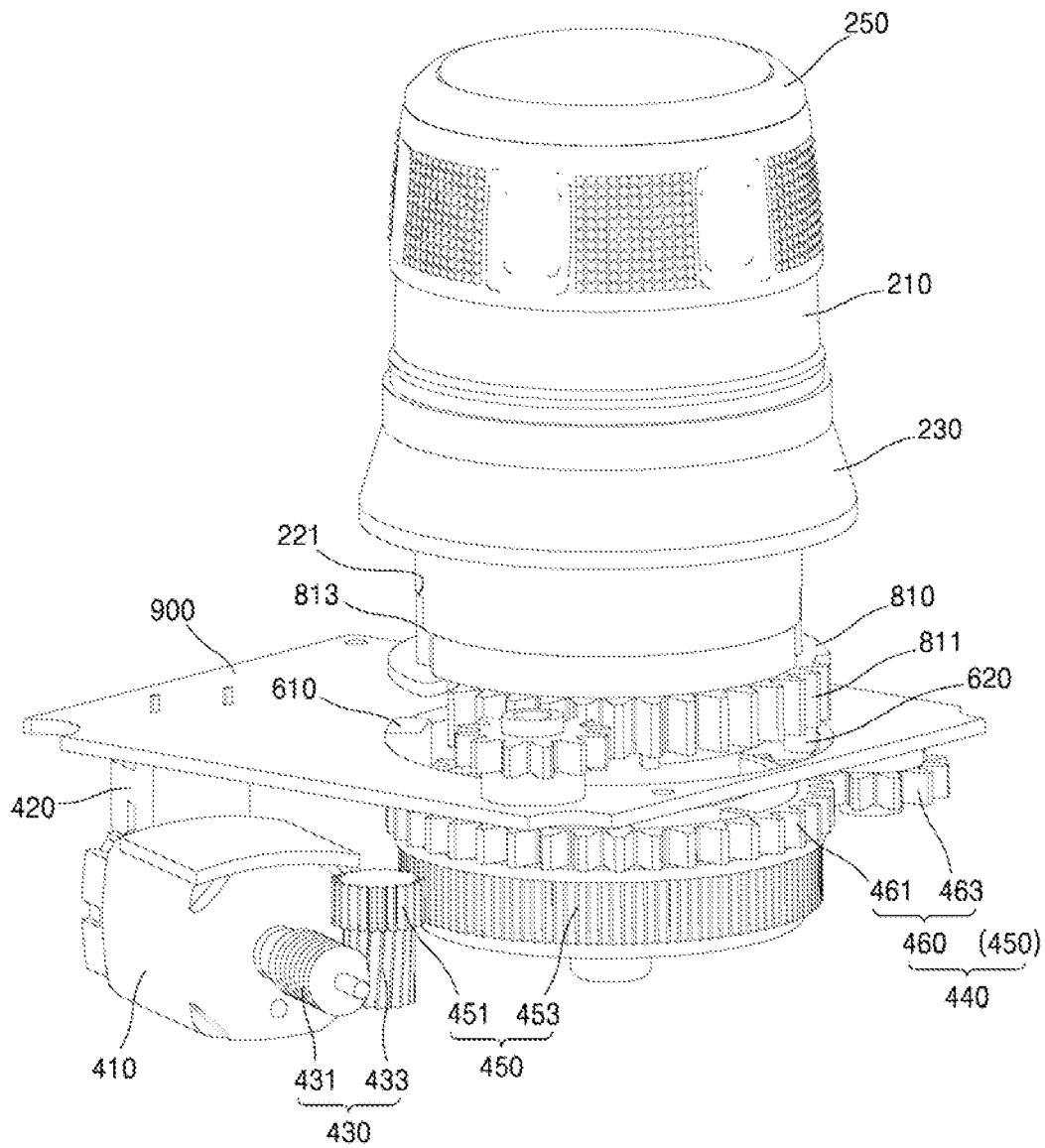
FIGS. 5 and 6 are schematic partial perspective and side views showing an electronic shift range switching device according to an embodiment of the present invention.
Figure 6:
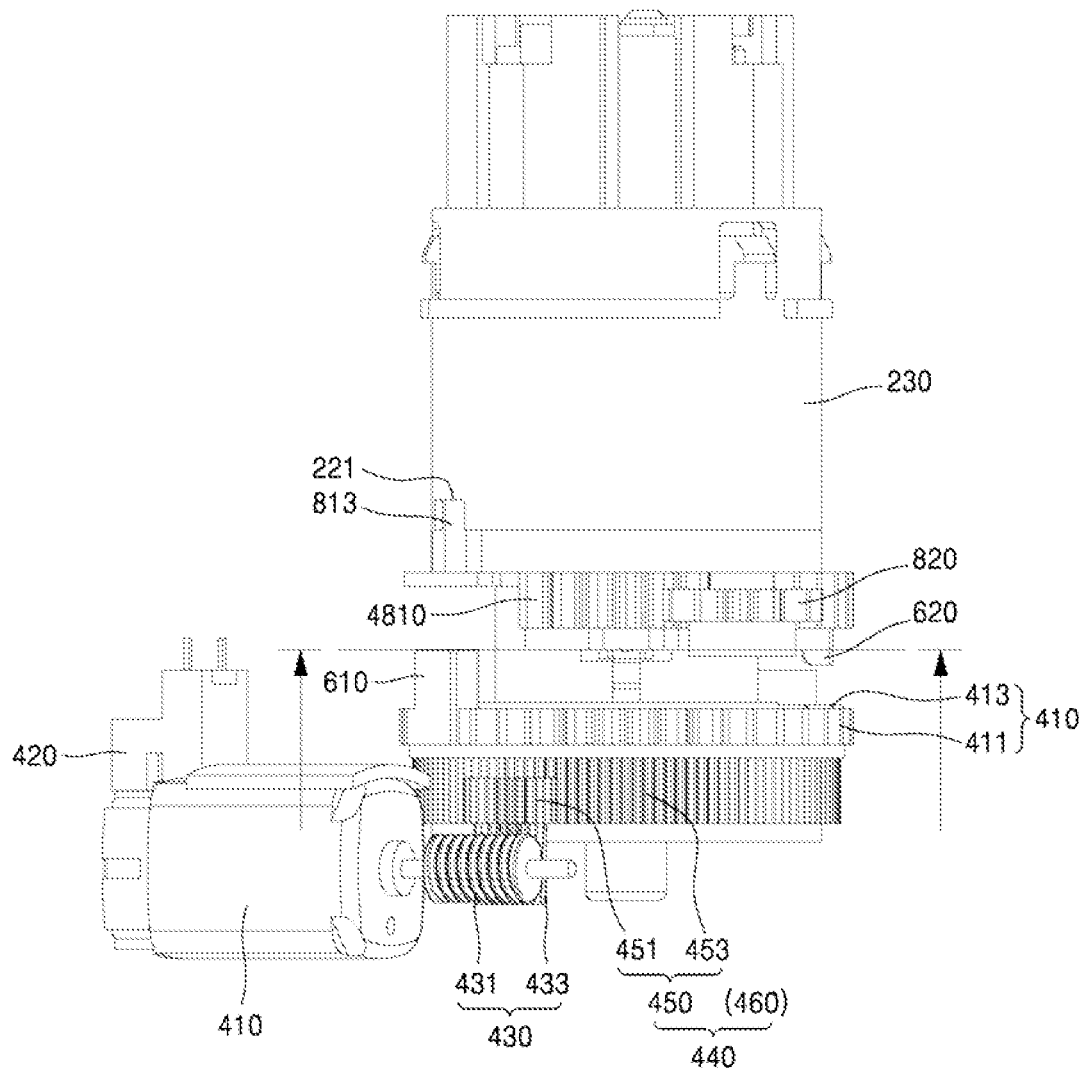

In the meantime, as shown in FIGS. 4 to 6, the locking correction integrated unit 300 controls whether or not to interrupt the rotation of the shifting knob unit 200 and returns a position of the shifting knob unit 200 to the P shift range in a self-correction manner under a predetermined condition. In other words, the present invention has a rotation interruption structure in which a locked state is maintained when there is no input of a brake on signal from a vehicle brake sensor by a driver's stepping on a brake pedal even though the shift lever is in the P shift range or the N shift range after the start of the engine of a vehicle, and the locked state is released when there is any input of a brake on signal from the vehicle brake sensor so as to prevent an accident caused by sudden unintended acceleration or a driver's misoperation in the vehicle. In addition, simultaneously, the present invention allows the shift range of the vehicle to return to a predetermined shift range, for example, the P shift range in this embodiment in a self-correction manner when the shift range is switched to the D shift range that is not safe after the turning off the engine of the vehicle so that a problem caused by the shift range upon a driver's reboarding of the vehicle and starting of the engine of the vehicle can be prevented. The rotation interruption and self-correction returning operation of the locking correction integrated unit in the present invention is performed through a single driver provided in single number.

More specifically, the locking correction integrated unit 300 includes an integrated single drive unit 400, an interlocking unit 500, and a self-correction unit 600.

The integrated single drive unit 400 includes a single driver 410 provided in single number. The single driver 410 of the integrated single drive unit 400 is implemented as an electric motor in this embodiment, and the type of the electric motor can be selected in various manners depending on predetermined design specifications.

The interlocking unit 500 controls whether or not to interrupt the rotation of the shifting knob unit 200 by using a driving force applied thereto from the single drive unit 400, and the self-correction unit 600 returns the position of the shifting knob unit 200 to the P shift range in a self-correction manner under the predetermined condition by using the driving force applied thereto from the single drive unit 400.

Figure 7:
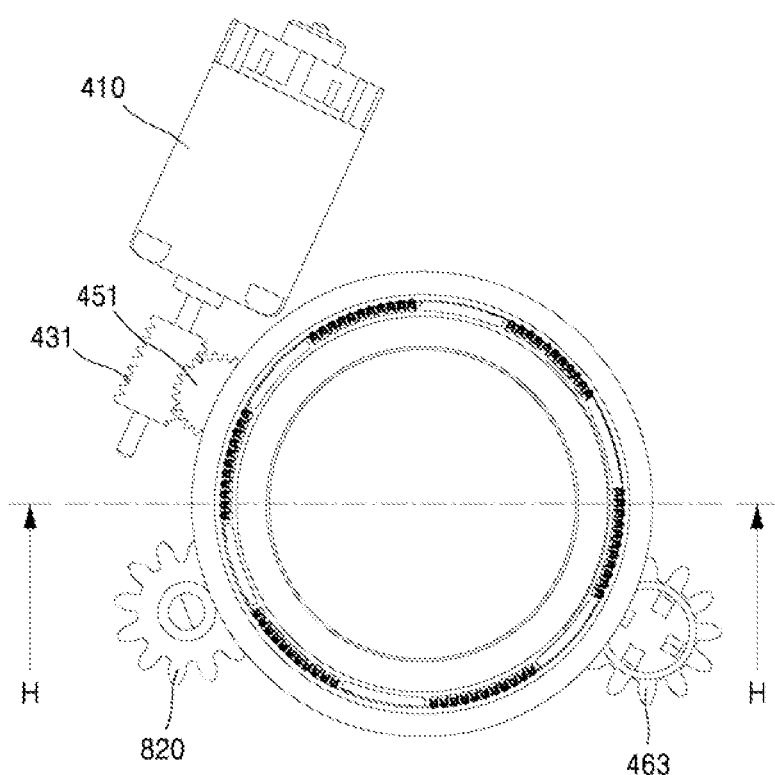
FIG. 7 is a partial top plan view illustrating an electronic shift range switching device according to an embodiment of the present invention.
Figure 8:
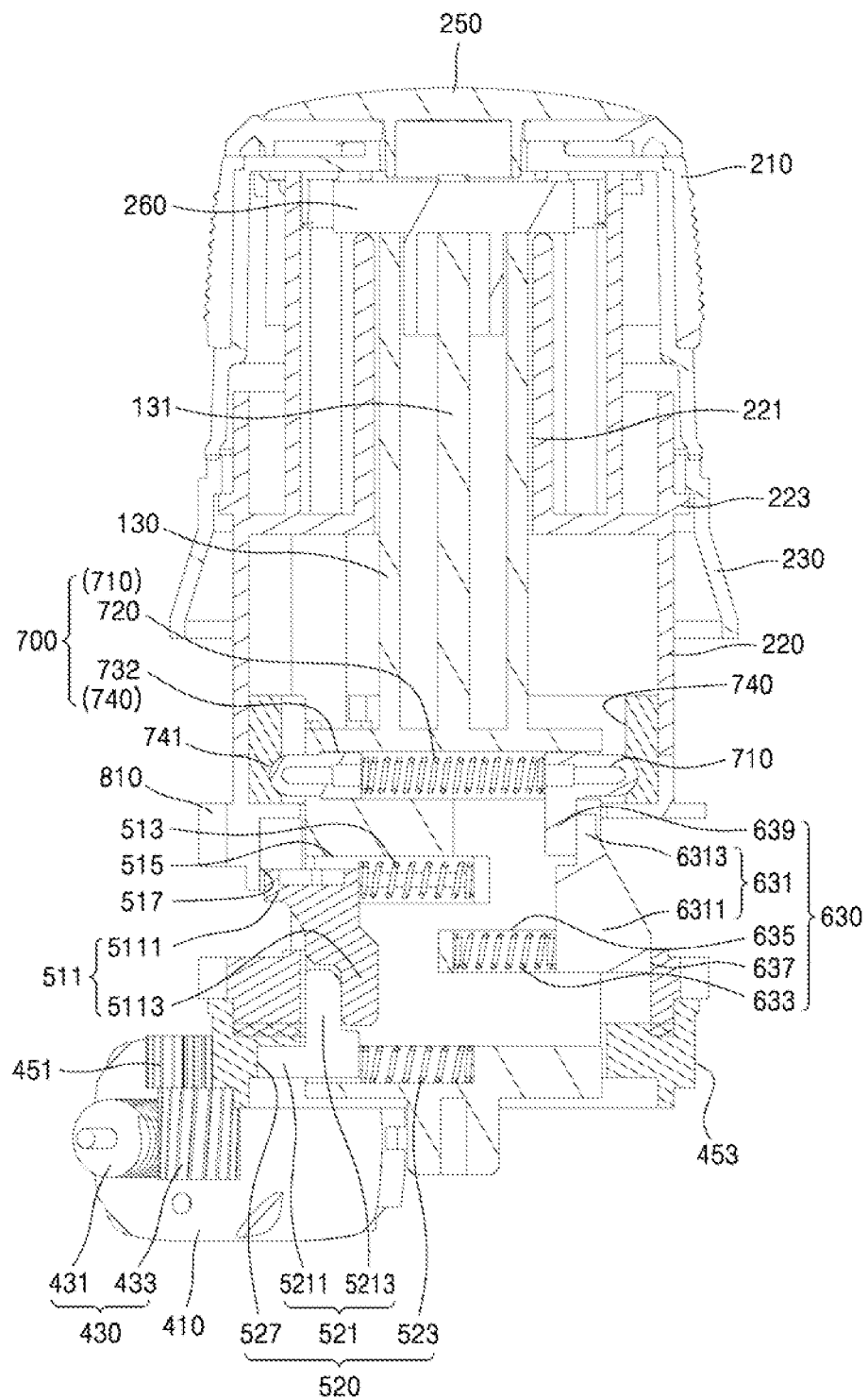
FIG. 8 is a longitudinal cross-sectional view taken along the line H-H of FIG. 7 in an electronic shift range switching device according to an embodiment of the present invention.

FIG. 7 shows a top plan view of a partial configuration of the electronic shift range switching device according to the present invention, and FIG. 8 shows a longitudinal cross-sectional view taken along the line H-H of FIG. 7.

First, a drive side, that is, the integrated single drive unit 400 will be described hereinafter. A single driver 410 of the integrated single drive unit 400 is driven in response to a drive control signal from a control unit (not shown) to generate a driving force, which enables an operation with a speed or torque varying depending on driving conditions so that the rotation of the shifting knob unit 200 can be restricted or the self-correction returning operation for the shift range can be implemented after the turning off of the engine of the vehicle.

The integrated single drive unit 400 includes a single driver holder 420 for holding the single driver 410 in position. In some embodiments, the integrated single drive unit 400 may further include a connector for electrical connection to the single driver holder 420.

The integrated single drive unit 400 further includes a single driver transfer unit 430 and a single sharing transfer unit 440. The single driver transfer unit 430 is brought into contact with the single driver 410 to receive the driving force from the single driver 410 and transfer the driving force to the interlocking unit 500. In this embodiment, the single driver transfer unit 430 and the single driver 410 are directly coupled to each other, but can be modified in various manners depending on design specifications.

The single driver transfer unit 430 includes a first transfer unit 431 and a second transfer unit 433. The first transfer unit 431 and the second transfer unit 433 are formed as gear transfer structures, but this is merely an example and can be modified in various manners, such as being formed as belt pulley transfer structures in some embodiments.

The first transfer unit 431 is disposed on a drive shaft of the single driver 410, and the second transfer unit 433 is meshingly engaged with the first transfer unit 431 so as to be rotated. The first transfer unit 431 is implemented as a worm gear that is connected at one end thereof to the drive shaft of the single driver 410, and the second transfer unit 433 is implemented as a worm wheel gear that meshes with the first transfer unit 431. The second transfer unit 433 forms a structure in which it is integrally formed with a single sharing transfer driving gear 451 of the single sharing transfer gear unit 450 which will be described later.

More specifically, the single sharing transfer unit 440 is brought at least partially into contact with the single driver transfer unit 430 to receive the driving force from the single driver transfer unit 430 and transfer a moving force for permitting the movement of the interlocking unit 500 and the received driving force to the interlocking unit 500 and the self-correction unit 600, respectively.

The single sharing transfer unit 440 includes the single sharing transfer gear unit 450. The single sharing transfer gear unit 450 is brought into direct contact with the single driver transfer unit 430 to receive the driving force from the single driver transfer unit 430 and transfer a moving force for permitting the movement of the interlocking unit 500 and the received driving force to the interlocking unit 500 and the self-correction unit 600, respectively.

The single sharing transfer gear unit 450 includes a single sharing transfer driving gear 451, and as single sharing transfer main gear 453. In this embodiment, the single sharing transfer driving gear 451 and the single sharing transfer main gear 453 are formed to have a spur gear structure that are circumscribed with each other, but can be modified in various manners depending on design specifications.

The single sharing transfer driving gear 451 is integrally formed with the single driver transfer unit 430 with gear ratios different from each other, and share a center of rotation as a coaxial structure so that the rotation speed thereof can be controlled through the gear ratios with different radii. In addition, the single sharing transfer main gear 453 is meshingly engaged with the single sharing transfer driving gear 451. By virtue of this structure, a rotational force of the single sharing transfer main gear 453 can be transferred to the interlocking unit 500 and/or the self-correction unit 600.

In addition, the single sharing transfer unit 440 may further include a single sharing transfer sensing gear unit 460. The single sharing transfer sensing gear unit 460 is a constituent element for detecting the rotation state of the single sharing transfer gear unit 450. Thus, a shifting range sensing unit 800 which will be described later may be partially disposed on the single sharing transfer sensing gear unit 460.

More specifically, the single sharing transfer sensing gear unit 460 includes a single sharing transfer sensing main gear 461 and a single sharing transfer sensing sub gear 463. The single sharing transfer sensing main gear 461 is integrally formed with the single sharing transfer main gear 453 with gear ratios different from each other, and the single sharing transfer sensing sub gear 463 is meshingly engaged with the single sharing transfer sensing main gear 461 so as to be rotated. A constituent element for detecting the rotation state of the single sharing transfer gear unit 450 is provided on the single sharing transfer sensing sub gear 463. Thus, the shifting range sensing unit 800 which will be described later may be partially disposed on the single sharing transfer sensing sub gear 463, and such a configuration enables to confirm information regarding the position state of a part of the interlocking unit and the self-correction unit.

By virtue of the above configuration of the integrated single drive unit 400, the driving force generated from the single driver 410 provided in single number is transferred to the interlocking unit 500 and the self-correction unit 600 as a driving force for implementing the locking/unlocking or self-correction returning operation via the single driver transfer unit and the single sharing transfer unit.

The interlocking unit 500 controls whether or not to interrupt the rotation of the shifting knob unit 200 by using the driving force applied thereto from the single drive unit 400. The interlocking unit 500 includes a trigger cam pin unit 520 and interlocking cam pin unit 510.

The trigger cam pin unit 520 is at least partially movably disposed within the housing unit 100 and is movable by means of the integrated single drive unit 400.

More specifically, the trigger cam pin unit 520 includes a trigger pin accommodating part 525, a trigger pin elastic part 523, a trigger pin 521, and a trigger pin cam 527.

The trigger pin accommodating part 525 is formed within the housing unit 100. More specifically, the trigger pin accommodating part 525 is formed within the housing shaft 130. In other words, the trigger pin accommodating part 525 is formed on an outer circumferential surface of a lower end of the housing shaft 130 to define a space therein, and other constituent elements, i.e., the trigger pin elastic part 523 and the trigger pin 521 can be accommodingly disposed movably in the trigger pin accommodating part 525 through an opened one side of the trigger pin accommodating part 525.

The trigger pin elastic part 523 is disposed within the trigger pin accommodating part 525, and is elastically supported inside the trigger pin accommodating part 525. The trigger pin elastic part 523 is implemented as a coil type spring, but can be modified in various manners depending on design specifications within the scope of providing an elastic force, such as being implemented as a separate pin type spring.

The trigger pin 521 has a structure in which it is brought at one end thereof into contact with the trigger pin elastic part 523 so as to be elastically supported by the trigger pin elastic part 523. The other end of the trigger pin 521 is brought into contact with the trigger pin cam 527 disposed correspondingly thereto through an opened space of the trigger pin accommodating part 525.

The trigger pin 521 includes a trigger pin body 5211 and a trigger pin interlocking contactor 5213. The trigger pin body 5211 is brought at one end thereof into contact with the trigger pin elastic part 523 so as to be elastically supported by the trigger pin elastic part 523 and is brought at the other end thereof into constant contact with the trigger pin cam 527. In this embodiment, the trigger pin interlocking contactor 5213 has a structure in which it is formed extending upwardly from one side of an upper end of the trigger pin body 5211 so that the trigger pin 521 is implemented in a '⊥' shape, but is not limited thereto.

Figure 9:
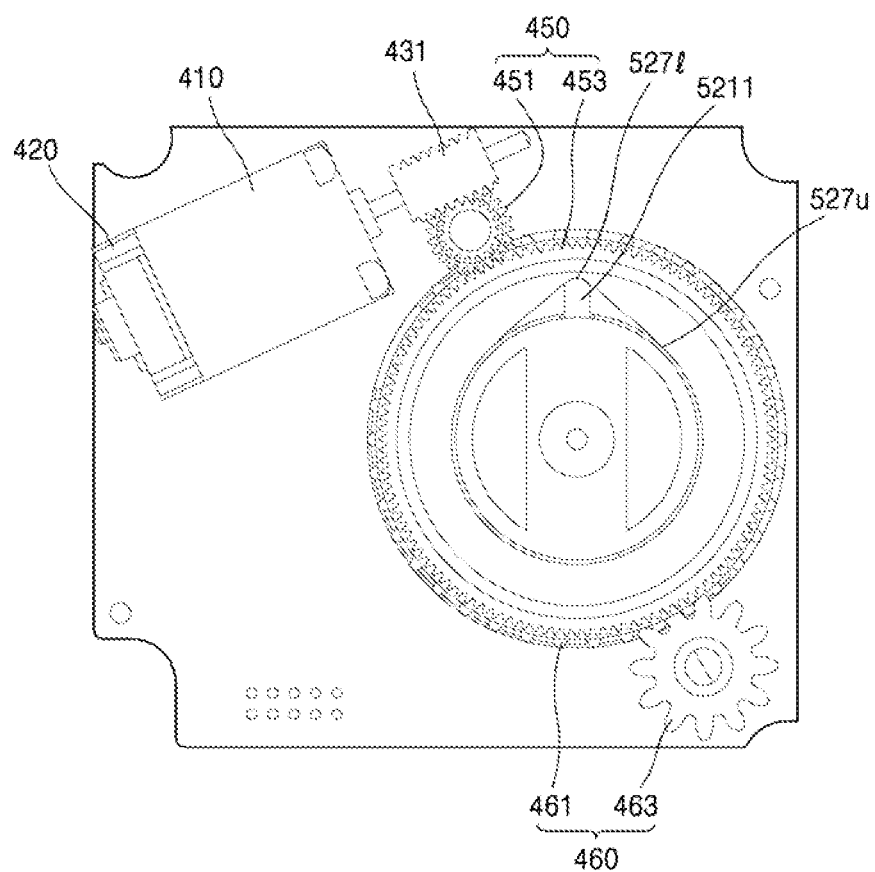
FIGS. 9 and 10 are partial bottom views showing an electronic shift range switching device according to an embodiment of the present invention.
Figure 10:
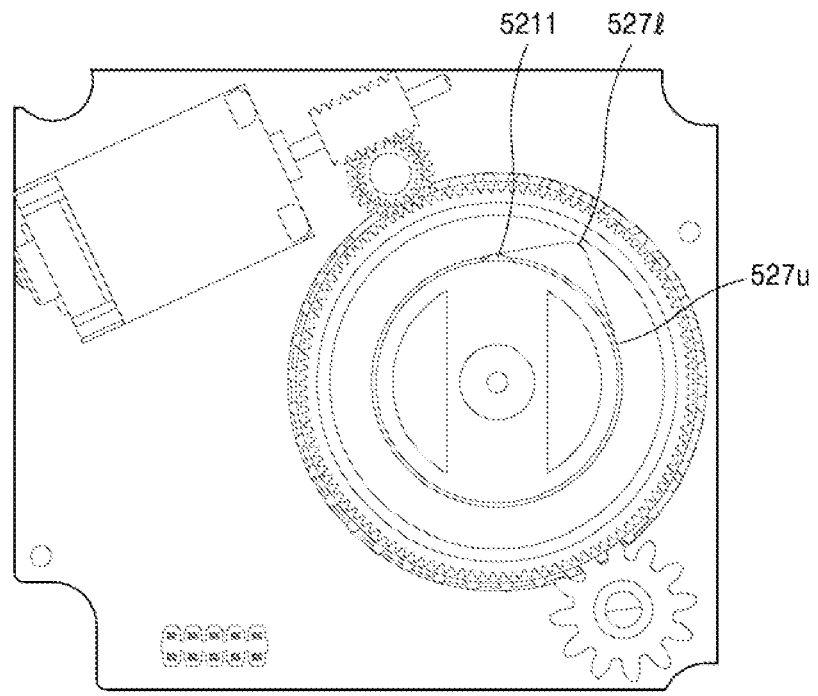
Figure 11:
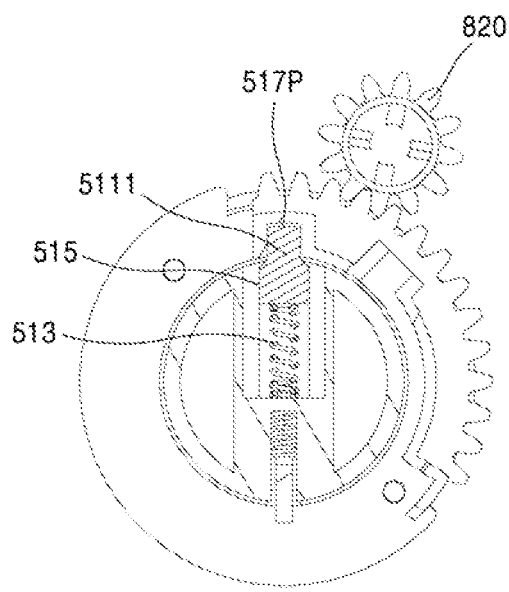
FIGS. 11 and 12 are schematic partial transverse cross-sectional views illustrating a locked/unlocked state of an interlocking unit in a state where a shift lever is in a P shift range in an electronic shift range switching device according to an embodiment of the present invention.
Figure 12:
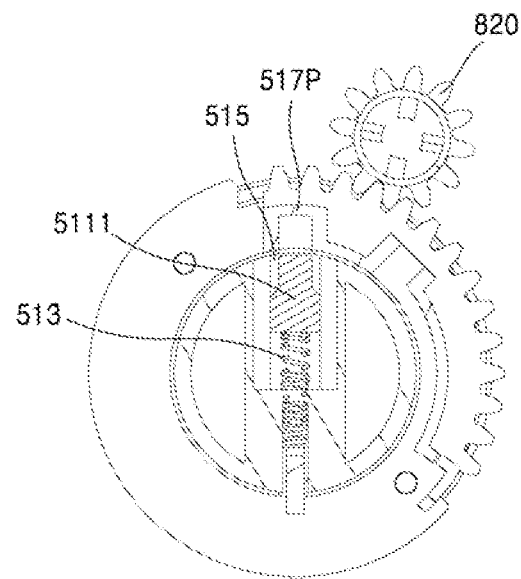
Figure 13:
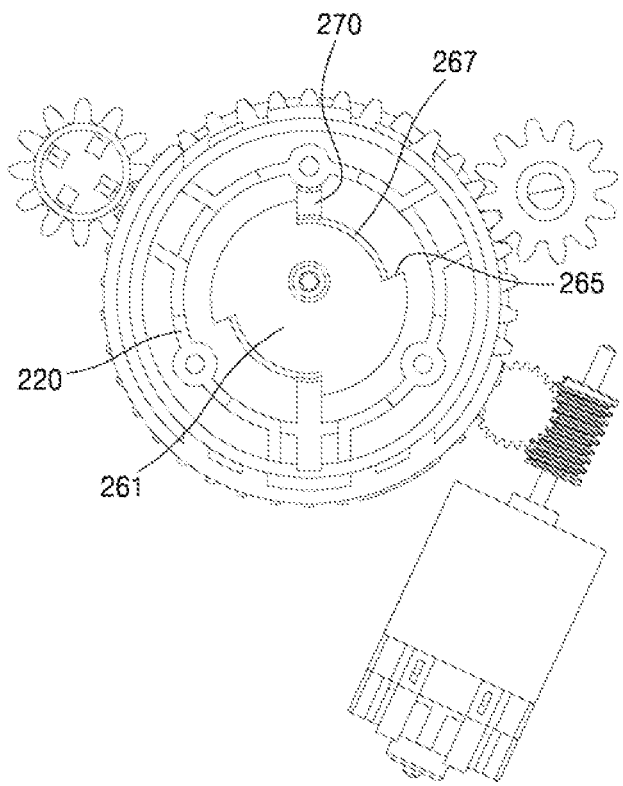
FIG. 13 is a schematic partial transverse cross-sectional view illustrating a knob stopper part in a state where a shift lever is in a P shift range in an electronic shift range switching device according to an embodiment of the present invention.
Figure 14:
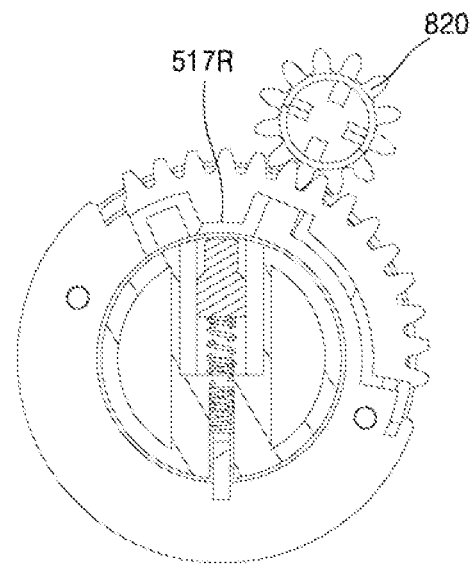
FIG. 14 is a schematic partial transverse cross-sectional view illustrating an interlocking unit in a state where a shift lever is in an R shift range in an electronic shift range switching device according to an embodiment of the present invention.
Figure 15:
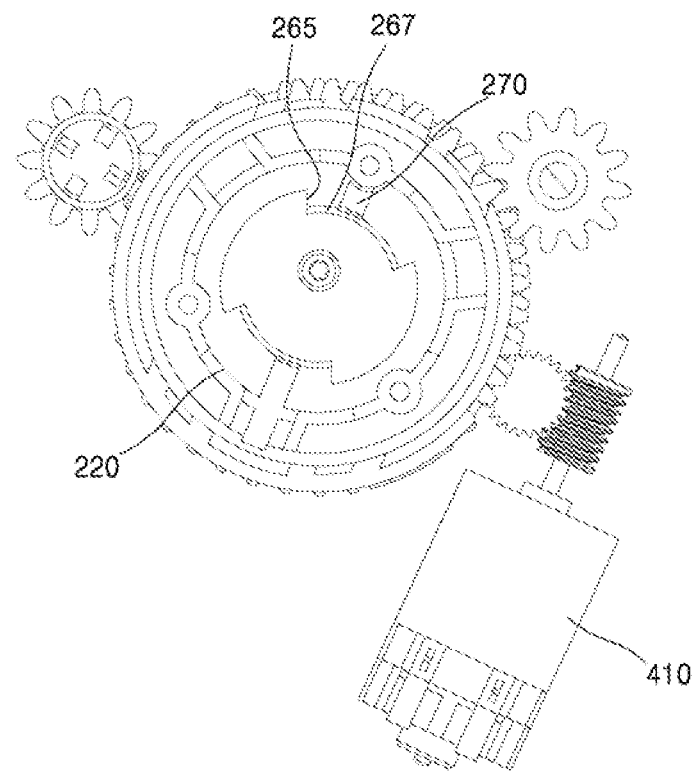
FIG. 15 is a schematic partial transverse cross-sectional view illustrating a knob stopper part in a state where a shift lever is in an R shift range in an electronic shift range switching device according to an embodiment of the present invention.
Figure 16:
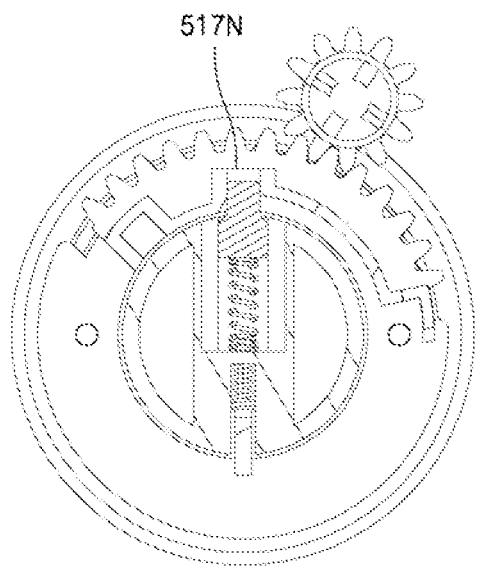
FIGS. 16 and 17 are schematic partial transverse cross-sectional views illustrating a locked/unlocked state of an interlocking unit in a state where a shift lever is in an N shift range in an electronic shift range switching device according to an embodiment of the present invention.
Figure 17:
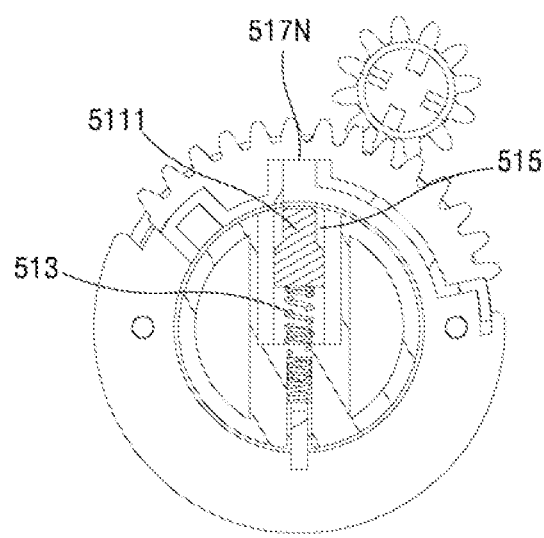

The trigger pin cam 527 is disposed spaced apart from the trigger pin accommodating part 525 and is brought at least partially into constant contact with the other end of the trigger pin 521. In this embodiment, the trigger pin cam 527 has a structure in which it is formed at least at one side of the integrated single drive unit 400, more specifically at the inside of an underside of a lower end of the single sharing transfer main gear 453 included in single sharing transfer gear unit 450 of the single sharing transfer unit 440 (see FIGS. 9 and 10), but can be positively selected in various manners depending on design specifications. The trigger pin cam 527 includes a trigger pin cam locking part 5271 and a trigger pin cam unlocking part 527u. When the trigger pin cam locking part 5271 and the trigger pin 521 abut against each other, the trigger pin 521 is in a protruded state on the drawing sheet not to press the interlocking pin 511 which will be described later in a central direction. When the trigger pin cam unlocking part 527u and the trigger pin 521 abut against each other, the trigger pin 521 is in an accommodated state on the drawing sheet to press the interlocking pin 511 which will be described later in a central direction so that a lock release state for unlocking the engagement state between the interlocking pin 511 and an interlocking pin cam 517 in the P shift range or N shift range which will be described later can be established.

In the meantime, the interlocking cam pin unit 510 is movably disposed at least at one side thereof within the housing unit 100 and is movably brought at least at the other side thereof into direct contact with the trigger cam pin unit 520 to interrupt the rotation of the shifting knob unit 200.

The interlocking cam pin unit 510 includes an interlocking pin accommodating part 515, an interlocking pin elastic part 513, an interlocking pin 511, and an interlocking pin cam 517. The interlocking pin accommodating part 515 is formed within the housing unit 100. More specifically, the interlocking pin accommodating part 515 is formed within the housing shaft 130 of the housing unit 100. The interlocking pin accommodating part 515 is formed as a recess space structure in which it is opened at one end thereof, and the interlocking pin elastic part 513 and the interlocking pin 511 are movably disposed in the interlocking pin accommodating part 515. In this embodiment, the locking pin accommodating part 515 is integrally formed with the trigger pin accommodating part 525 in a fluid communication manner. In some embodiments, the locking pin accommodating part 515 and the trigger pin accommodating part 525 can be modified in various manners, such as being formed as separate individual spaces which do not fluidically communicate with each other.

The interlocking pin elastic part 513 is disposed within the interlocking pin accommodating part 515 and is elastically supported inside the interlocking pin accommodating part 515. The interlocking pin elastic part 513 is implemented as a coil type spring, but can be selected in various manners within the scope of applying an elastic force to the interlocking pin 511 in a predetermined direction, i.e., through the opened space of the interlocking pin accommodating part 515.

The interlocking pin 511 is brought at one end thereof into contact with the interlocking pin elastic part 513 so as to be elastically supported by the interlocking pin elastic part 513, and the interlocking pin cam 517 is disposed spaced apart from the interlocking pin accommodating part 515 and is brought at least partially into constant contact with the other end of the interlocking pin 511.

The interlocking pin cam 517 (see FIG. 11) has a structure in which it is formed on the inner circumferential surface of a shifting range sensing main moving part 810 of a shifting range sensing unit 800. The interlocking pin 511 is formed as a separate element from the shifting range sensing main moving part 810, but can be modified in various manners, such as having a configuration in which no relative rotation between the interlocking pin 511 an the shifting range sensing main moving part 810 occurs and they are integrally connected with each other. The interlocking pin cam 517 includes a cam profile varying depending on a distance in a radial direction from the center thereof. As shown in FIGS. 11, 12, 14, 16, 17, 19 and 21, the interlocking pin cam 517 includes an interlocking pin cam's P range part 517P, an interlocking pin cam's R range part 517R, an interlocking pin cam's N range part 517N, an interlocking pin cam's D range part 517D, and an interlocking pin cam's S range part 517S.

The interlocking pin cam's P range part 517P refers to a cam profile part of a shift position taken when a P range selection of the electronic shift range switching device 10 is made, the interlocking pin cam's R range part 517R refers to a cam profile part of a shift position taken when an R range selection of the electronic shift range switching device 10 is made, the interlocking pin cam's N range part 517N refers to a cam profile part of a shift position taken when an R range selection of the electronic shift range switching device 10 is made, the interlocking pin cam's D range part 517D refers to a cam profile part of a shift position taken when a D range selection of the electronic shift range switching device 10 is made, and the interlocking pin cam's S range part 517S refers to a cam profile part of a shift position taken when an S range selection of the electronic shift range switching device 10 is made. The interlocking pin cam's P range part 517P and the interlocking pin cam's N range part 517N have a larger value in a radial direction from a center of rotation to form an accommodating space of an end of the interlocking pin body 5111 which will be described later, and the interlocking pin cam's R range part 517R, the interlocking pin cam's D range part 517D, and the interlocking pin cam's S range part 517S have a smaller value in a radial direction from a center of rotation than the case of the interlocking pin cam's P range part 517P and the interlocking pin cam's N range part 517N to form a region abutting against the end of the interlocking pin body 5111 which will be described later.

In this case, the interlocking pin 511 includes an interlocking pin body 5111 and an interlocking pin trigger contactor 5113. The interlocking pin body 5111 is brought at one end thereof into contact with the interlocking pin elastic part 513 so as to be elastically supported by the interlocking pin elastic part 513 and is brought at the other end thereof into constant contact with the interlocking pin cam 517. The interlocking pin trigger contactor 5113 is integrally connected to another side of the interlocking pin body 5111 and is brought into contact with the trigger cam pin unit 520. Similarly to the trigger pin 521 as described above, the interlocking pin 511 is formed in a shape, but its specific shape can be modified in various manners depending on design specifications, which is the same as described above.

In this embodiment, in the interlocking unit 500, an interference may occur between the trigger cam pin unit 520 and the interlocking cam pin unit 510 in some cases. That is, when the trigger cam pin unit 52 is at least partially moved toward a center of rotation of the shifting knob unit 200, the interlocking pin 511 of the interlocking cam pin unit 510 is moved together with the at least part of the trigger cam pin unit 520 so that a contact state between the interlocking pin 511 and the interlocking pin cam 517 can be released.

In other words, when the trigger cam pin unit 520 is at least partially moved toward a center of rotation of the shifting knob unit 200, the interlocking pin 511 of the interlocking cam pin unit 510 is at least partially moved together with the trigger pin 521 so that the contact state between the interlocking pin 511 and the interlocking pin cam 517 can be released.

More specifically, as shown in FIG. 4, the interlocking pin trigger contactor 5113 is positioned nearer to the center of rotation of the shifting knob unit 200 than an at least part of the trigger cam pin unit 520 on a contact point between the interlocking pin trigger contactor 5113 and the at least part of the trigger cam pin unit 520, so that when the trigger pin 521 of the trigger cam pin unit 520 is moved to the center of rotation of the shifting knob unit 200, the trigger pin interlocking contactor 5213 of the trigger pin 521 is brought into abutting contact with the interlocking pin trigger contactor 5113 and simultaneously is also moved to the center of rotation of the shifting knob unit 200 together with the interlocking pin trigger contactor 5113. Thus, there may occur a formation or change of a locked/unlocked state due to the contact between an end of the interlocking pin body 5111 and the interlocking pin cam 517.

In addition, meanwhile, the self-correction unit 600 according to an embodiment of the present invention returns the position of the shifting knob unit 200 to the P shift range in a self-correction manner under the predetermined condition by using the driving force applied thereto from the single drive unit 400. The self-correction unit 600 includes a self-correction lead rib 610 and a self-correction following rib 620. The correction lead rib 610 is movable by the driving force applied thereto from the single drive unit 400, and the self-correction following rib 620 is disposed spaced apart from the self-correction lead rib 610 in such a manner as to be capable of coming into close contact with the self-correction lead rib 610 so that the self-correction following rib 620 rotates around the center of rotation of the shifting knob unit 200 by receiving the driving force through the self-correction lead rib 610.

In this case, the self-correction lead rib 610 of the electronic shift range switching device 10 according to an embodiment of the present invention can have a structure in which it is integrally connected to at least one side of the single sharing transfer unit 440, more specifically to the single sharing transfer main gear 453 of the single sharing transfer gear unit 450, and the self-correction following rib 620 can have a structure in which it is integrally formed with the shifting range sensing main moving part 810 of the shifting range sensing unit 800.

In other words, the electronic shift range switching device 10 according to an embodiment of the present invention further includes a shifting range sensing unit 800 configured to detect the rotation state of the shifting knob unit 200 and the single sharing transfer unit. The self-correction lead rib 610 is integrally disposed at least at one side of the single sharing transfer unit 440, and the self-correction following rib 620 is integrally disposed at least at one side of the shifting range sensing unit 800.

By virtue of such a configuration, the driving force from the single driver 410 allows the single sharing transfer main gear 453 to be rotated via the single driver transfer unit 430 and then the single sharing transfer gear unit 450 of the single sharing transfer unit 440, and the self-correction lead rib 610 integrally formed with the single sharing transfer main gear 453 is displaced along with the rotation of the single sharing transfer main gear 453 to forcibly push the self-correction following rib 620 to a predetermined position, i.e., the P range position to establish an engagement between the self-correction following rib 620 and the interlocking pin cam 517 formed inside the shifting range sensing main moving part 810 so that it can be prevented that there occurs a restriction in the engine start due to an erroneous positioning of the shift range occurring upon a driver's reboarding of the vehicle and then switching of the engine to an on state after the turning off of the engine.

Meanwhile, the electronic shift range switching device 10 according to an embodiment of the present invention further includes a detent unit 700. The detent unit 700 haptically senses the rotation of the shifting knob unit 200 when the shifting knob unit 200 is rotated with respect to an at least part of the housing unit 100.

More specifically, the detent unit 700 includes a detent profile cam 740, a detent accommodating part 730, a detent pin 710, and a detent elastic part 720.

The detent profile cam 740 is disposed to circumferentially surround the housing shaft 130 of the housing unit 100 in such a manner as to be spaced apart from an outer circumference of the housing shaft 130. In this embodiment, the detent profile cam 740 has a structure in which a cam profile is formed on an inner circumferential surface of a separate ring-shaped body. Although not shown in this embodiment, the shape and pattern of the detent profile cam 740 can be selected in various manners. The detent accommodating part 730 is formed within the housing shaft 130. In this embodiment, the detent accommodating part 730 has a structure in which it is formed within the housing shaft 130 so as to penetrate through the housing shaft 130, but cam be modified in various manners depending on design specifications.

The detent pin 710 is accommodatingly disposed at least at one end thereof within the detent accommodating part 730 in a movable manner and is brought at the other end thereof into direct contact with the detent profile cam 740. The detent elastic part 720 is disposed at least partially within the detent accommodating part 730 and is brought at least at one end thereof into contact with the detent pin 710 to elastically support the detent pin 710.

Although it has been illustrated in this embodiment that the detent pin 710 is arranged such that both ends thereof are oppositely oriented by 180° from each other, it can be modified in various manners depending on design specifications, such as being provided only in single number or being changed in arrangement angle.

In this case, the self-correction unit 600 may further include a configuration in which the implementation of the operation of the detent pin 710 is restricted. That is, the self-correction unit 600 of the present invention includes a self-correction detent retraction unit 630. The self-correction detent retraction unit 630 releases a direct contact between an at least part of the detent pin 710 and the detent profile cam 740 when the self-correction lead rib 610 and the self-correction following rib 620 are moved together in a state of being engaged with each other.

More specifically, the self-correction detent retraction unit 630 includes a retraction accommodating part 637, a retraction pin 631, a retraction elastic part 633, a retraction cam 635, and a retraction detent pin contactor 639.

The retraction accommodating part 637 is formed on the outer circumferential surface of the housing shaft 130 in a recess structure which is opened at one side thereof. In this embodiment, the retraction accommodating part 637 has a structure in which it is formed at a region of the housing shaft 130, which is oppositely oriented by 180° from the interlocking pin accommodating part 515, but is not limited thereto.

The retraction pin 631 is accommodatingly disposed at least partially within the retraction accommodating part 637 in a movable manner, and the retraction elastic part 633 is brought at one end thereof into contact with the retraction pin 631 and is supportingly brought at the other end thereof into contact with the inside of the retraction accommodating part 637 to elastically support the retraction pin 631. In addition, the retraction cam 635 forms a state where it is brought into constant contact with one end of the retraction pin 631 supported by the retraction elastic part 633.

The retraction pin 631 includes a retraction pin body 6311 and a retraction pin detent contactor 6313. The retraction pin body 6311 is elastically supported by the retraction elastic part 633. In this embodiment, the retraction pin detent contactor 6313 is integrally formed with the retraction pin body 6311 in such a manner as to extend vertically upwardly from one side of the retraction pin body 6311, and is brought into contact with the retraction detent pin contactor 639.

The retraction detent pin contactor 639 is integrally formed with the detent pin 710 so as to be contactable with the retraction pin 631 so that the retraction detent pin contactor 639 can be moved together with the retraction pin 631 upon the movement of the retraction pin 631.

In this case, the retraction detent pin contactor 639 is positioned nearer to the center of rotation of the shifting knob unit 200 than an at least part of the retraction pin 631 on a contact point between the retraction detent pin contactor 639 and the at least part of the retraction pin 631. In other words, when viewed in a radial direction from the center of rotation of the shifting knob unit 200, an outer surface of the retraction detent pin contactor 639 is brought into contact with an inner surface of the retraction pin detent contactor 6313. By virtue of a structure in which there occurs a change in the contact state between the retraction detent pin contactor 639 and the retraction pin body 6311 along a cam profile of the retraction cam 635, when the retraction pin body 6311 is moved in a central direction of the shifting knob unit 200, a moving force is transferred to the detent pin 710 through the outer surface of the retraction detent pin contactor 639 abutting against the inner surface of the retraction pin detent contactor 6313, and the detent pin 710 connected to the retraction detent pin contactor 639 is retractingly moved in the central direction of the shifting knob unit 200 to release a contact between the detent pin 710 and the detent profile cam 740 so that during the operation of the returning of the position of the shifting knob unit 200 to the P shift range through the self-correction unit 600 so as to establish the self-correction returning state of the locking correction integrated unit 300, detent contact sound or vibration can be prevented from being generated upon the contact between the detent pin 710 of the detent unit 700 and the detent profile cam 740.

In addition, the electronic shift range switching device 10 further includes the shifting range sensing unit 800. The shifting range sensing unit 800 detects at least the rotation state of the shifting knob unit 200.

In other words, the shifting range sensing unit 800 includes a shifting range sensing main moving part 810, a shifting range sensing sub moving part 820, a shifting range sensing moving part 830, and a shifting range sensing fixing part 840. That is, the shifting range sensing main moving part 810 is connected to the shifting knob unit 200 so as to be moved together with the shifting knob unit 200, the shifting range sensing sub moving part 820 is connected to the shifting range sensing main moving part 810 so as to be movable relative to the shifting range sensing main moving part 810. The shifting range sensing moving part 830 is disposed on the shifting range sensing sub moving part 820, and the shifting range sensing fixing part 840 is disposed on the unit substrate 900 to correspond to a position of the shifting range sensing moving part 830. The unit substrate 900 is disposed within the housing unit 100 so as to be held in a fixed position. The shifting range sensing moving part 830 is implemented as a magnet in this embodiment, and the shifting range sensing fixing part 840 is implemented as a magnetic sensor.

Further, in this embodiment, the shifting range sensing unit 800 may further include a constituent element for detecting information on a relevant element in order to implement the locking/unlocking operation of the interlocking unit 500 for locking/unlocking the rotation of the shifting knob unit 200 and/or the self-correction returning operation of returning a shift range of a position other than a predetermined shift range after the turning off of the engine to a predetermined shift range, for example, the P shift range through the locking correction integrated unit by detecting the movement of the single sharing transfer main gear 453 as described above as well as the rotation state of the shifting knob unit 20.

In other words, the shifting range sensing unit 800 may further include a shifting range sharing transfer sensing moving part 860 and a shifting range sharing transfer sensing fixing part 850. The shifting range sharing transfer sensing moving part 860 is disposed on the single sharing transfer sensing sub gear, and the shifting range sharing transfer sensing fixing part 850 is disposed on the unit substrate 900 to correspond to a position of the shifting range sharing transfer sensing moving part 860. The shifting range sharing transfer sensing moving part 860 is implemented as a magnet, and the shifting range sharing transfer sensing fixing part 850 is implemented as a magnetic sensor so as to detect the rotation of the single sharing transfer main gear 453 so that the operation state or the position information of the interlocking unit 500 and the self-correction unit 600 can be identified.

An operation process of the electronic shift range switching device 10 of the present invention will be described hereinafter with reference to the drawings.

First, the electronic shift range switching device 10 of the present invention is configured to be incapable of being operated immediately even though a driver switches the engine to an on state. For example, the electronic shift range switching device 10 is operated such that when a driver steps on a brake pedal in a state where a mode is set to form the P shift range, a brake on signal is generated from a brake sensor to cause a control unit (not shown) to apply a drive control signal for implementing the locking/unlocking operation to the single driver 410, which in turn performs a predetermined rotation operation. This rotation operation of the single driver 410 causes the single driver transfer unit 430 to be rotated to rotate the single sharing transfer main gear 453, and thus there occurs a change in a contact state between the trigger pin cam 527 of the interlocking unit 500, which is disposed on the underside of a lower end of the single sharing transfer main gear 453, and the trigger pin 521. In other words, as described above, the trigger pin cam 527 is disposed spaced apart from the trigger pin accommodating part 525 and is brought at least partially into constant contact with the other end of the trigger pin 521. In this embodiment, the trigger pin cam 527 has a structure in which it is formed at least at one side of the integrated single drive unit 400, more specifically at the inside of the underside of a lower end of the single sharing transfer main gear 453 included in single sharing transfer gear unit 450 of the single sharing transfer unit 440 (see FIGS. 9 and 10), but can be positively selected in various manners depending on design specifications. The trigger pin cam 527 includes a trigger pin cam locking part 5271 and a trigger pin cam unlocking part 527u. When the trigger pin cam locking part 5271 and the trigger pin 521 abut against each other, the trigger pin 521 is in a protruded state on the drawing sheet not to press the interlocking pin 511 which will be described later in a central direction. When the trigger pin cam unlocking part 527u and the trigger pin 521 abut against each other, the trigger pin 521 is in an accommodated state on the drawing sheet to press the interlocking pin 511 which will be described later in the central direction so that a lock release state for unlocking the engagement state between the interlocking pin 511 and the interlocking pin cam 517 in the P shift range which will be described later can be established (see FIGS. 11 and 12). This equally applies to the case where a lock release state for unlocking the engagement state between the interlocking pin 511 and the interlocking pin cam 517 in the N shift range is established (see FIGS. 16 and 17). The use of the driving force from the integrated single drive unit 400 including the single driver of the locking correction integrated unit 300 enables to interrupt a certain rotation operation through the switching of the locked/unlocked state by the operation of the interlocking unit 500. An unlocked state is maintained through the contact between the trigger pin 521 and the trigger pin cam unlocking part 527u in the R shift range (see FIG. 14), the D shift range (see FIG. 19) and the S shift range (see FIG. 21) by the rotation of the shifting knob unit 200 to establish an unlocked state of the interlocking cam pin unit 510 so that the rotation of the shifting knob unit 200 can be performed stably.

Figure 27:
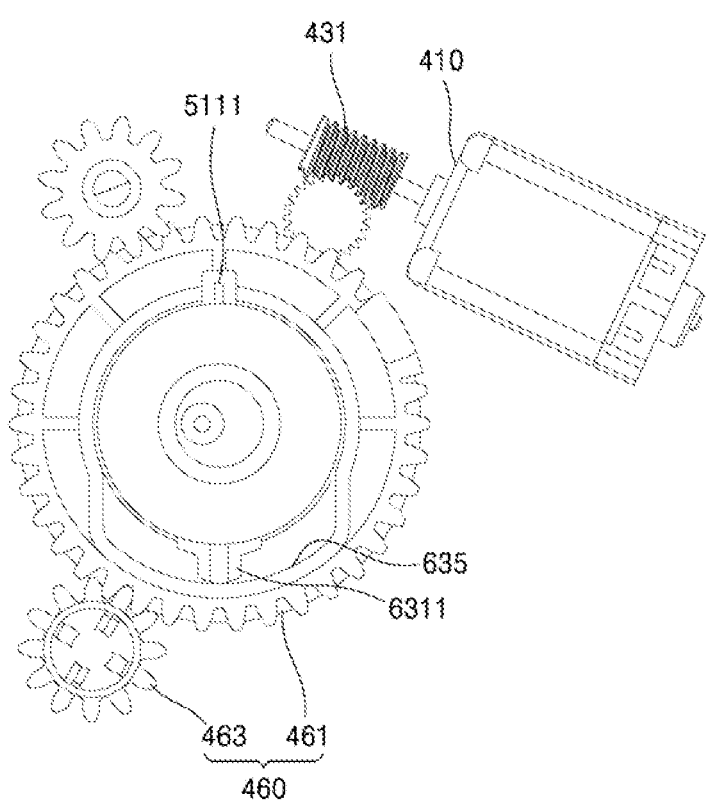
FIGS. 27 to 29 are schematic partial top plan views illustrating an operation process of a self-correction detent retraction unit of a self-correction unit of an electronic shift range switching device according to an embodiment of the present invention.
Figure 28:
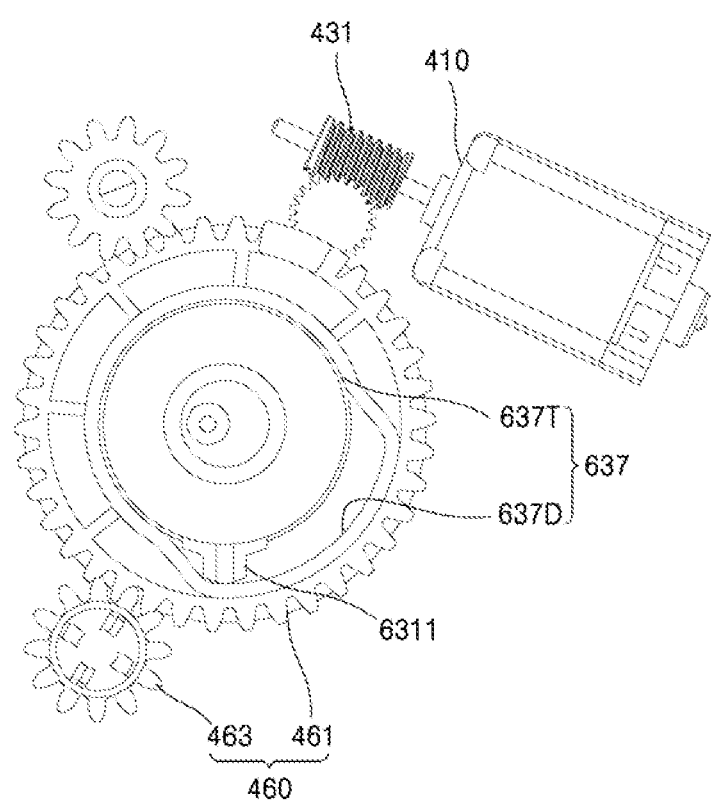
Figure 29:
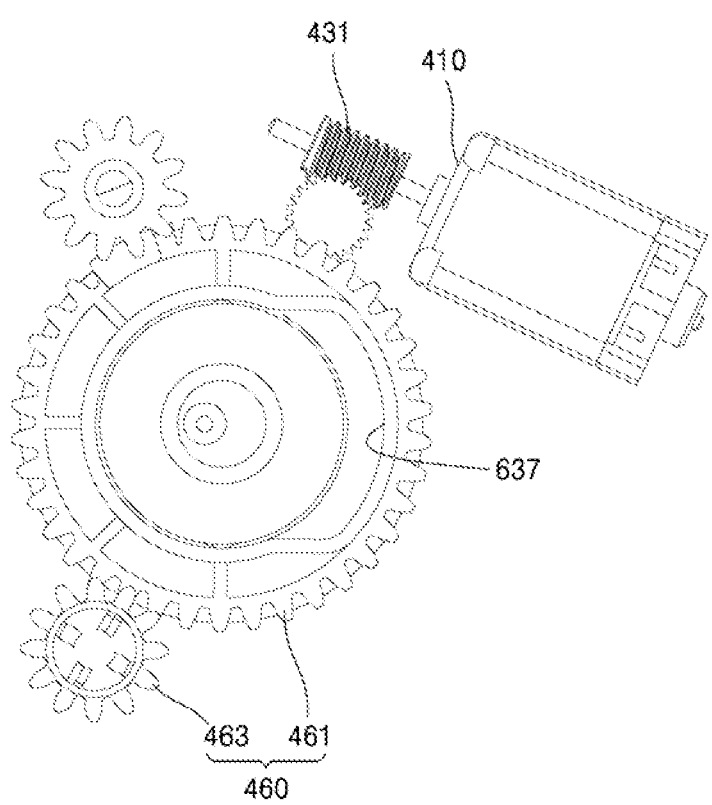

In the meantime, FIGS. 23 to 26 are schematic bottom perspective views illustrating an operation process of a self-correction unit of an electronic shift range switching device according to an embodiment of the present invention, and FIGS. 27 to 29 are schematic partial top plan views illustrating an operation process of a self-correction detent retraction unit of a self-correction unit of an electronic shift range switching device according to an embodiment of the present invention.

Referring to FIGS. 23 to 29, when a start on signal is generated due to a driver's unintended operation after the driver turns off the engine to cause the position of the shifting knob unit 200 of the electronic shift range switching device 10 to be switched to the D shift range, but not in the P shift range or N shift range, the control unit (not shown) of a vehicle can operate the self-correction unit 600 by using the driving force from the integrated single drive unit 400 to perform the self-correction returning operation for the position of the shift range. That is, in the case where the start on signal is generated, when the control unit (not shown) senses that a current shift range is the D shift range, it applies the drive control signal to the single driver 410, which in turn generates the driving force to allow the single sharing transfer main gear 453 to be rotated via the single driver transfer unit 430 and then the single sharing transfer gear unit 450 of the single sharing transfer unit 440, and the self-correction lead rib 610 integrally formed with the single sharing transfer main gear 453 is displaced along with the rotation of the single sharing transfer main gear 453 to forcibly push the self-correction following rib 620 to a predetermined position, i.e., the P range position to establish an engagement between the self-correction following rib 620 and the interlocking pin cam 517 formed inside the shifting range sensing main moving part 810 so that it can be prevented that there occurs a restriction in the engine start due to an erroneous positioning of the shift range occurring upon a driver's reboarding of the vehicle and then switching of the engine to an on state after the turning off of the engine.

In the above process, the self-correction detent retraction unit 630 can be operated such that a constant contact state between the detent unit and the self-correction detent retraction unit is released to prevent an unnecessary noise from being generated, which is the same as described above.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

What is claimed is:

1. An electronic shift range switching device configured to control a shift range of a vehicle, the device comprising:
   a housing unit;
   a shifting knob unit disposed within the housing unit in such a manner as to be rotatable with respect to the housing unit; and
   a locking correction integrated unit,
   wherein rotation of the shifting knob unit is interruptible by the locking correction integrated unit,
   wherein rotation of the shifting knob unit is interrupted and a position of the shifting knob unit is returned to a predetermined shift range by the locking correction integrated unit under a predetermined condition of the shift range of the vehicle not being in the predetermined shift range when an engine of the vehicle is turned off,
   wherein the locking correction integrated unit comprises:
      an integrated single drive unit comprising a singular single driver;
      an interlocking unit configured to control interruption of the rotation of the shifting knob unit by using a driving force applied thereto from the single drive unit; and
      a self-correction unit configured to return the position of the shifting knob unit to the predetermined shift range under the predetermined condition by using the driving force applied thereto from the single drive unit, and wherein the interlocking unit comprises:
      a trigger cam pin unit movably disposed at least partially within the housing unit so as to be movable in horizontal directions toward a center of rotation of the shifting knob unit by means of the integrated single drive unit; and
      an interlocking cam pin unit movably disposed at least at one side thereof within the housing unit and movably brought in the horizontal directions at least at the other side thereof into direct contact with the trigger cam pin unit to interrupt the shifting knob unit.

2. The electronic shift range switching device according to claim 1, wherein the integrated single drive unit comprises:
   a single driver transfer unit configured to be brought into contact with the single driver to receive a driving force from the single driver and transfer the driving force to interlocking unit; and
   a single sharing transfer unit configured to be brought at least partially into contact with the single driver transfer unit to receive the driving force from the single driver transfer unit and transfer a moving force for permitting the movement of the interlocking unit and the driving force received from the single driver transfer unit to the interlocking unit and the self-correction unit, respectively.

3. The electronic shift range switching device according to claim 2, wherein the single driver transfer unit comprises:
   a first transfer unit disposed on a drive shaft of the single driver; and
   a second transfer unit meshingly engaged with the first transfer unit so as to be rotated.

4. The electronic shift range switching device according to claim 2, wherein the single sharing transfer unit comprises a single sharing transfer gear unit configured to be brought into direct contact with the single driver transfer unit to receive the driving force from the single driver transfer unit and transfer a moving force for permitting the movement of the interlocking unit and the driving force received from the single driver transfer unit to the interlocking unit and the self-correction unit, respectively.

5. The electronic shift range switching device according to claim 4, wherein the single sharing transfer gear unit comprises:
   a single sharing transfer driving gear integrally formed with the single driver transfer unit with gear ratios different from each other; and
   a single sharing transfer main gear meshingly engaged with the single sharing transfer driving gear.

6. The electronic shift range switching device according to claim 4, wherein the single sharing transfer unit further comprises a single sharing transfer sensing gear unit configured to detect the rotation state of the single sharing transfer gear unit.

7. The electronic shift range switching device according to claim 6, wherein the single sharing transfer sensing gear unit comprises:

a single sharing transfer sensing main gear integrally formed with the single sharing transfer main gear with gear ratios different from each other; and a single sharing transfer sensing sub gear meshingly engaged with the single sharing transfer sensing main gear so as to be rotated.

8. The electronic shift range switching device according to claim 1, wherein the trigger cam pin unit comprises:
a trigger pin accommodating part formed within the housing unit;
a trigger pin elastic part elastically supported inside the trigger pin accommodating part;
a trigger pin brought at one end thereof into contact with the trigger pin elastic part so as to be elastically supported by the trigger pin elastic part; and
a trigger pin cam disposed spaced apart from the trigger pin accommodating part and brought at least partially into constant contact with the other end of the trigger pin.

9. The electronic shift range switching device according to claim 8, wherein the trigger pin cam is integrally formed at least at one side of the integrated single drive unit.

10. The electronic shift range switching device according to claim 8, wherein the trigger pin comprises:
a trigger pin body brought at one end thereof into contact with the trigger pin elastic part so as to be elastically supported by the trigger pin elastic part and brought at the other end thereof into constant contact with the trigger pin cam;
a trigger pin interlocking contactor integrally connected to another side of the trigger pin body and brought into contact with the interlocking cam pin unit.

11. The electronic shift range switching device according to claim 1, wherein the interlocking cam pin unit comprises:
an interlocking pin accommodating part formed within the housing unit;
an interlocking pin elastic part elastically supported inside the interlocking pin accommodating part;
an interlocking pin brought at one end thereof into contact with the interlocking pin elastic part so as to be elastically supported by the interlocking pin elastic part; and
an interlocking pin cam disposed spaced apart from the interlocking pin accommodating part and brought at least partially into constant contact with the other end of the interlocking pin.

12. The electronic shift range switching device according to claim 11, wherein the interlocking pin comprises:
an interlocking pin body brought at one end thereof into contact with the interlocking pin elastic part so as to be elastically supported by the interlocking pin elastic part and brought at the other end thereof into constant contact with the interlocking pin cam; and
an interlocking pin trigger contactor integrally connected to one side of the interlocking pin body and brought into contact with the trigger cam pin unit,
whereby when the trigger cam pin unit is at least partially moved toward the center of rotation of the shifting knob unit, the interlocking pin of the interlocking cam pin unit is moved together with the at least part of the trigger cam pin unit so that a contact state between the interlocking pin and the interlocking pin cam can be released.

13. The electronic shift range switching device according to claim 12, wherein the interlocking pin trigger contactor is positioned nearer to the center of rotation of the shifting knob unit than the at least part of the trigger cam pin unit on a contact point between the interlocking pin trigger contactor and the at least part of the trigger cam pin unit.

14. The electronic shift range switching device according to claim 1, wherein the self-correction unit comprises:
a self-correction lead rib configured to be movable by the driving force applied thereto from the single drive unit; and
a self-correction following rib disposed spaced apart from the self-correction lead rib in such a manner as to be capable of coming into close contact with the self-correction lead rib so that the self-correction following rib rotates around the center of rotation of the shifting knob unit by receiving the driving force through the self-correction lead rib.

15. The electronic shift range switching device according to claim 14, wherein the integrated single drive unit comprises:
a single driver transfer unit configured to be brought into direct contact with the single driver to receive a driving force from the single driver and transfer the driving force to the interlocking unit; and
a single sharing transfer unit brought at least partially into contact with the single driver transfer unit to receive the driving force from the single driver transfer unit and transfer a moving force for permitting the movement of the interlocking unit and the driving force received from the single driver transfer unit to the interlocking unit and the self-correction unit, respectively, and
wherein the electronic shift range switching device further comprises a shifting range sensing unit configured to detect the rotation state of the shifting knob unit and the single sharing transfer unit,
wherein the self-correction lead rib is disposed on one side of the single sharing transfer unit, and
wherein the self-correction following rib is disposed on one side of the shifting range sensing unit.

16. The electronic shift range switching device according to claim 1, further comprising a detent unit configured to indicate haptically the rotation of the shifting knob unit when the shifting knob unit is rotated with respect to an at least part of the housing unit.

17. The electronic shift range switching device according to claim 15, further comprising a detent unit configured to indicate haptically the rotation of the shifting knob unit when the shifting knob unit is rotated with respect to an at least part of the housing unit, and
wherein the detent unit comprises:
a detent profile cam disposed to circumferentially surround a housing shaft of the housing unit in such a manner as to be spaced apart from an outer circumference of the housing shaft;
a detent accommodating part;
a detent pin accommodatingly disposed at least at one end thereof within the detent accommodating part in a movable manner and brought at the other end thereof into direct contact with the detent profile cam; and
a detent elastic part configured to elastically support the detent pin.

18. The electronic shift range switching device according to claim 17, wherein the self-correction unit comprises a self-correction detent retraction unit configured to release a direct contact between an at least part of the detent pin and the detent profile cam when the self-correction lead rib and the self-correction following rib are moved together in a state of being engaged with each other.

19. The electronic shift range switching device according to claim 18, wherein the self-correction detent retraction unit comprises:
a retraction accommodating part;
a retraction pin accommodatingly disposed at least partially within the retraction accommodating part in a movable manner;
a retraction elastic part configured to elastically support the retraction pin;
a retraction cam configured to establish a state where it is brought into constant contact with one end of the retraction pin; and
a retraction detent pin contactor integrally formed with the detent pin so as to be contactable with the retraction pin so that the retraction detent pin contactor can be moved together with the retraction pin upon the movement of the retraction pin.

20. The electronic shift range switching device according to claim 19, wherein the retraction detent pin contactor is positioned nearer to the center of rotation of the shifting knob unit than an at least part of the retraction pin on a contact point between the retraction detent pin contactor and the at least part of the retraction pin.

21. The electronic shift range switching device according to claim 19, wherein the retraction pin comprises:
a retraction pin body elastically supported by the retraction elastic part; and
a retraction pin detent contactor integrally formed with the retraction pin body so as to be brought into contact with the retraction detent pin contactor.

22. The electronic shift range switching device according to claim 1, further comprising a shifting range sensing unit configured to detect at least the rotation state of the shifting knob unit.

23. The electronic shift range switching device according to claim 22, wherein the shifting range sensing unit comprises:
a shifting range sensing main moving part connected to the shifting knob unit so as to be moved together with the shifting knob unit;
a shifting range sensing sub moving part connected to the shifting range sensing main moving part so as to be movable relative to the shifting range sensing main moving part;
a shifting range sensing moving part disposed on the shifting range sensing sub moving part; and
a shifting range sensing fixing part disposed on a unit substrate disposed within the housing unit so as to be held in a fixed position, to correspond to a position of the shifting range sensing moving part.

24. The electronic shift range switching device according to claim 23, wherein the locking correction integrated unit comprises: an integrated single drive unit comprising a singular single driver provided; an interlocking unit configured to control interruption of the rotation of the shifting knob unit by using a driving force applied thereto from the single drive unit; and a self-correction unit configured to return the position of the shifting knob unit to the predetermined shift range under the predetermined condition by using the driving force applied thereto from the single drive unit,
wherein the integrated single drive unit comprises:
a single driver transfer unit configured to be brought into contact with the single driver to receive a driving force from the single driver and transfer the driving force to interlocking unit; and
a single sharing transfer unit brought at least partially into contact with the single driver transfer unit to receive the driving force from the single driver transfer unit and transfer a moving force for permitting the movement of the interlocking unit and the driving force received from the single driver transfer unit to the interlocking unit and the self-correction unit, respectively,
wherein the single sharing transfer unit comprises:
a single sharing transfer gear unit configured to be brought into direct contact with the single driver transfer unit to receive the driving force from the single driver transfer unit and transfer a moving force for permitting the movement of the interlocking unit and the received driving force to the interlocking unit and the self-correction unit, respectively; and
a single sharing transfer sensing gear unit configured to detect the rotation state of the single sharing transfer gear unit,
wherein the single sharing transfer sensing gear unit comprises:
a single sharing transfer sensing main gear integrally formed with the single driver transfer unit with gear ratios different from each other; and
a single sharing transfer sensing sub gear meshingly engaged with the single sharing transfer sensing main gear so as to be rotated, and
wherein the shifting range sensing unit further comprises:
a shifting range sharing transfer sensing moving part disposed on the single sharing transfer sensing sub gear; and
a shifting range sharing transfer sensing fixing part disposed on a unit substrate to correspond to a position of the shifting range sharing transfer sensing moving part.

25. The electronic shift range switching device according to claim 1, wherein the shifting knob unit is disposed to be rotatable with respect to the housing unit, and further comprises a knob stopper part configured to restrict the rotation of the shifting knob unit.

26. The electronic shift range switching device according to claim 25, wherein the knob stopper part comprises:
a knob stopper body disposed in the housing unit; and
a knob stopper-corresponding part disposed at the shifting knob unit, and configured to restrict a relative rotation between the shifting knob unit and the knob stopper body by an engagement between the knob stopper body and the knob stopper-corresponding part within a predetermined angular range.

27. An electronic shift range switching device configured to control a shift range of a vehicle, the device comprising:
a housing unit;
a shifting knob unit exposed at one end thereof to the outside of the housing unit and disposed at the housing unit in such a manner as to be rotatable with respect to the housing unit; and
a locking correction integrated unit configured to return a position of the shifting knob unit to a predetermined shift range under a predetermined condition,
wherein the electronic shift range switching device further comprises a detent unit configured to indicate haptically the rotation of the shifting knob unit,
wherein the detent unit comprises:
a detent profile cam;
a detent pin brought at the one end thereof into contact with the detent profile cam, the detent pin being disposed to be movable in a horizontal direction toward a center of rotation of the shifting knob unit; and a detent elastic part configured to elastically support the detent pin, and wherein the electronic shift range switching device further comprises a self-correction detent retraction unit configured to release a contact between at least part of the detent pin and the detent profile cam when a position of the shifting knob unit is returned to a predetermined shift range by the locking correction integrated unit.

28. An electronic shift range switching device configured to control a shift range of a vehicle, the device comprising:
   a housing unit;
   a shifting knob unit exposed at one end thereof to the outside of the housing unit and disposed at the housing unit in such a manner as to be rotatable with respect to the housing unit; and
   a locking correction integrated unit configured to return a position of the shifting knob unit to a predetermined shift range under a predetermined condition,
   wherein the electronic shift range switching device further comprises a detent unit configured to indicate haptically the rotation of the shifting knob unit,
   wherein the detent unit comprises:
      a detent profile cam;
      a detent pin brought at the one end thereof into contact with the detent profile cam; and
      a detent elastic part configured to elastically support the detent pin, and
   wherein the electronic shift range switching device further comprises a self-correction detent retraction unit configured to release a contact between at least part of the detent pin and the detent profile cam when a position of the shifting knob unit is returned to a predetermined shift range by the locking correction integrated unit,
   wherein the self-correction detent retraction unit comprises:
      a retraction accommodating part;
      a retraction pin accommodatingly disposed at least partially within the retraction accommodating part in a movable manner;
      a retraction elastic part configured to elastically support the retraction pin;
      a retraction cam configured to establish a state where it is brought into constant contact with one end of the retraction pin; and
      a retraction detent pin contactor integrally formed with the detent pin so as to be contactable with the retraction pin so that the retraction detent pin contactor can be moved together with the retraction pin upon the movement of the retraction pin.

29. The electronic shift range switching device according to claim 28, wherein the retraction detent pin contactor is positioned nearer to the center of rotation of the shifting knob unit than an at least part of the retraction pin on a contact point between the retraction detent pin contactor and the at least part of the retraction pin.

30. The electronic shift range switching device according to claim 28, wherein the retraction pin comprises:
   a retraction pin body elastically supported by the retraction elastic part; and
   a retraction pin detent contactor integrally formed with the retraction pin body so as to be brought into contact with the retraction detent pin contactor.

* * * * *